US006639716B1

(12) United States Patent
Tomofuji

(10) Patent No.: US 6,639,716 B1
(45) Date of Patent: Oct. 28, 2003

(54) WAVELENGTH DIVISION MULTIPLEXING OPTICAL COMMUNICATION SYSTEM AND OPTICAL AMPLIFYING DEVICE

(75) Inventor: Hiroaki Tomofuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/499,032

(22) Filed: Feb. 7, 2000

(30) Foreign Application Priority Data

Feb. 8, 1999 (JP) .............................. 11-030349

(51) Int. Cl.[7] .............................. H04B 10/16; H01S 3/00
(52) U.S. Cl. .............................. 359/371.12; 359/341.41; 359/341.42; 359/174
(58) Field of Search .............................. 359/194, 337.12, 359/341.41, 341.42

(56) References Cited

U.S. PATENT DOCUMENTS

| | | | | |
|---|---|---|---|---|
| 5,510,926 A | * | 4/1996 | Bayart et al. ................ | 359/179 |
| 5,737,118 A | * | 4/1998 | Sugaya et al. ............... | 359/341 |
| 5,828,486 A | * | 10/1998 | Yoshida ........................ | 359/341 |
| 5,838,488 A | * | 11/1998 | Kobayashi ................... | 359/341 |
| 6,025,947 A | * | 2/2000 | Sugaya et al. ............... | 359/160 |
| 6,055,092 A | * | 4/2000 | Sugaya et al. ............... | 359/337 |
| 6,072,601 A | * | 6/2000 | Toyohara ..................... | 358/484 |
| 6,369,938 B1 | * | 4/2002 | Sugaya et al. .......... | 359/341.42 |

FOREIGN PATENT DOCUMENTS

| | | | |
|---|---|---|---|
| EP | 817415 | * | 1/1998 |
| JP | 10022979 | * | 1/1998 |

OTHER PUBLICATIONS

"Wide–Dynamic–Range WDM Optical Fiber Amplifiers for 32×10 Gb/s, SMF Transmission Systems" S. Kinoshita et al., Optical Amplifiers and Their Applications (OAA '98), Vail, Colorado.

"Large Capacity WDM Transmission Based on Wideband Erbium–Doped Fiber Amplifiers", S. Kinoshita et al., Optical Amplifiers and Their Applications (OAA '98), Vail, Colorado.

* cited by examiner

Primary Examiner—Nelson Moskowitz
(74) Attorney, Agent, or Firm—Staas & Halsey LLP

(57) ABSTRACT

The present invention aims at providing a WDM optical communication system adapted to avoid reduction of signal light power per one wavelength included in output light of an ALC operating optical amplifying device, to thereby improve transmission characteristics of WDM signal light. To this end, for each of a plurality of optical amplifying devices provided on the way of an optical fiber transmission path for interconnecting a transmitting terminal station and a receiving terminal station, the WDM optical communication system of the present invention comprises: an input light measuring section for measuring input light power; a correction value calculating section for obtaining ASE light power such as based on information of the input light power, to thereby calculate an output correction value for increasing an output setting level of ALC by the ASE light power; and a correction executing section for executing a correction for the output setting level of the optical amplifying device, in accordance with the output correction value. According to such a constitution, the signal light power per one wavelength included in the output light of each of the optical amplifying devices can be kept constant, irrespectively of the number of wavelengths.

24 Claims, 17 Drawing Sheets

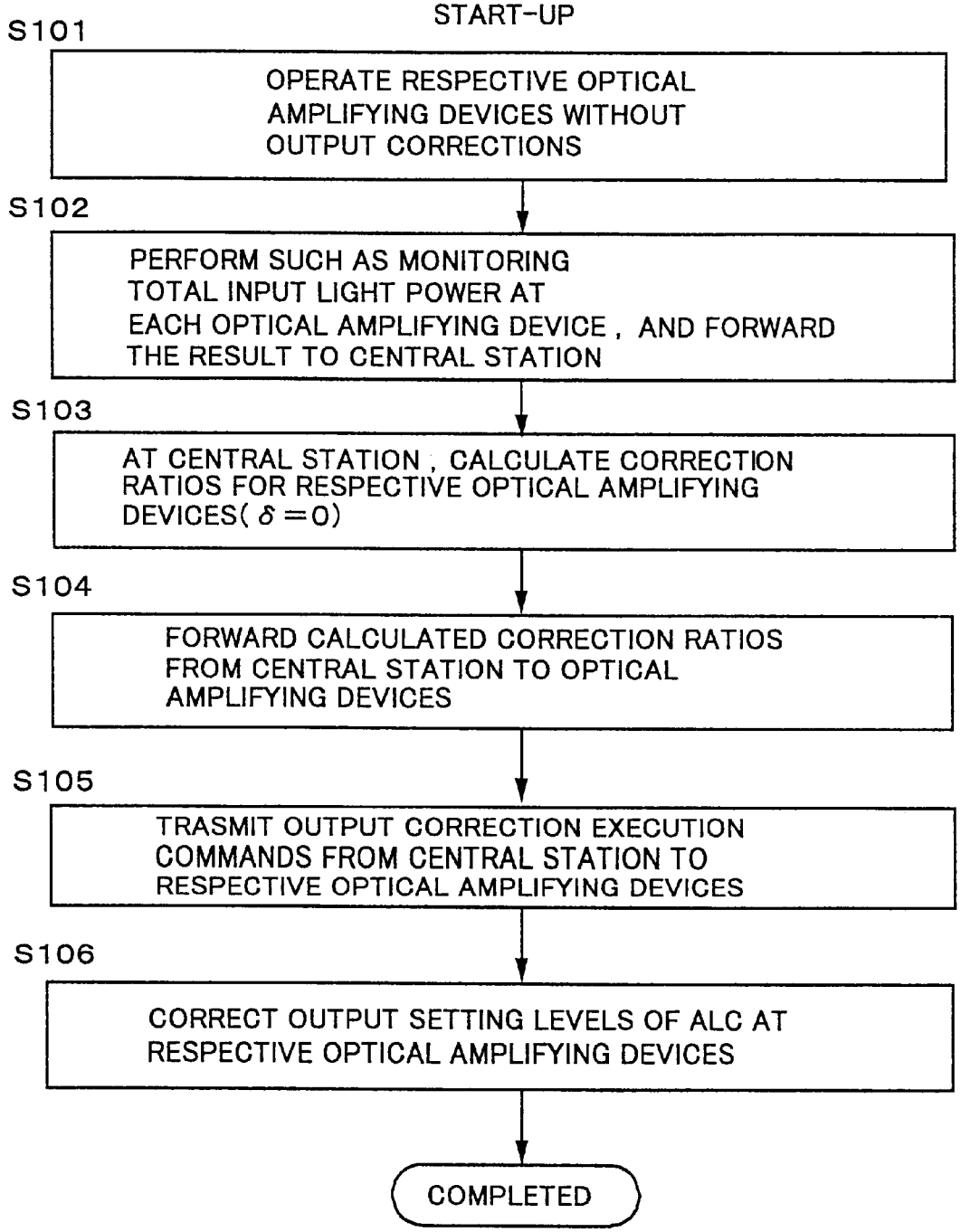

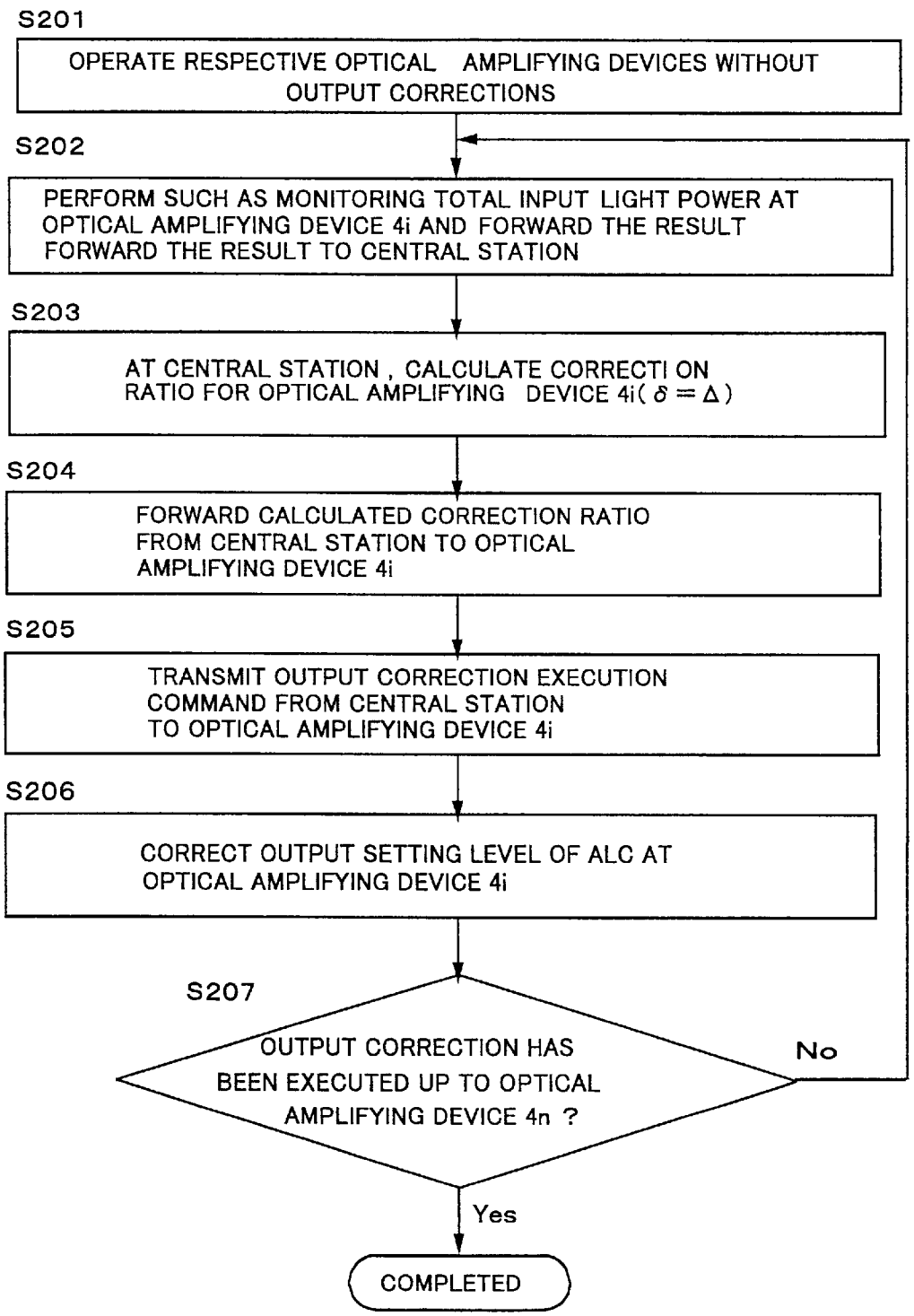

FIG.8

EMBODIMENT(1-1)
SIMULTANEOUS OUTPUT CORRECTION
PERFORMING PATTERN UNDER IN-SERVICE CONDITION

S301: RESPECTIVE OPTICAL AMPLIFYING DEVICES ARE OPERATING UNDER A CONDITION WHERE OUTPUT CORRECTIONS HAVE BEEN EXECUTED

S302: PERFORM SUCH AS MONITORING TOTAL INPUT LIGHT POWER AT EACH OPTICAL AMPLIFYING DEVICE, AND FORWARD THE RESULT TO CENTRAL STATION

S303: AT CENTRAL STATION, CALCULATE CORRECTION RATIOS FOR RESPECTIVE OPTICAL AMPLIFYING DEVICES ($\delta$ =PREVIOUSLY SET VALUE)

S304: FORWARD CALCULATED CORRECTION RATIOS FROM CENTRAL STATION TO OPTICAL AMPLIFYING DEVICES

S305: TRASMIT OUTPUT CORRECTION EXECUTION COMMANDS FROM CENTRAL STATION TO RESPECTIVE OPTICAL AMPLIFYING DEVICES

S306: RE-CORRECT OUTPUT SETTING LEVELS OF ALC AT RESPECTIVE OPTICAL AMPLIFYING DEVICES

COMPLETED

FIG.9

EMBODIMENT(1-1)
SEQUENTIAL OUTPUT CORRECTION
PERFORMING PATTERN UNDER IN-SERVICE CONDITION

S401
RESPECTIVE OPTICAL AMPLIFYING DEVICES ARE OPERATING UNDER A CONDITION WHERE OUTPUT CORRECTIONS HAVE BEEN EXECUTED

S402
PERFORM SUCH AS MONITORING TOTAL INPUT LIGHT POWER AT OPTICAL AMPLIFYING DEVICE 4i, AND FORWARD THE RESULT TO CENTRAL STATION

S403
AT CENTRAL STATION, CALCULATE CORRECTION RATIO FOR OPTICAL AMPLIFYING DEVICE 4i ($\delta_{i-1} = \Delta_{i-1}$)

S404
FORWARD NEWLY CALCULATED CORRECTION RATIO FROM CENTRAL STATION TO OPTICAL AMPLIFYING DEVICES 4i

S405
TRANSMIT OUTPUT CORRECTION EXECUTION COMMAND FROM CENTRAL STATION TO OPTICAL AMPLIFYING DEVICE 4i

S406
RE-CORRECT OUTPUT SETTING LEVEL OF ALC AT OPTICAL AMPLIFYING DEVICE 4i

S407
OUTPUT CORRECTION HAS BEEN EXECUTED UP TO OPTICAL AMPLIFYING DEVICE 4n? — No → (back to S402)

Yes ↓

COMPLETED

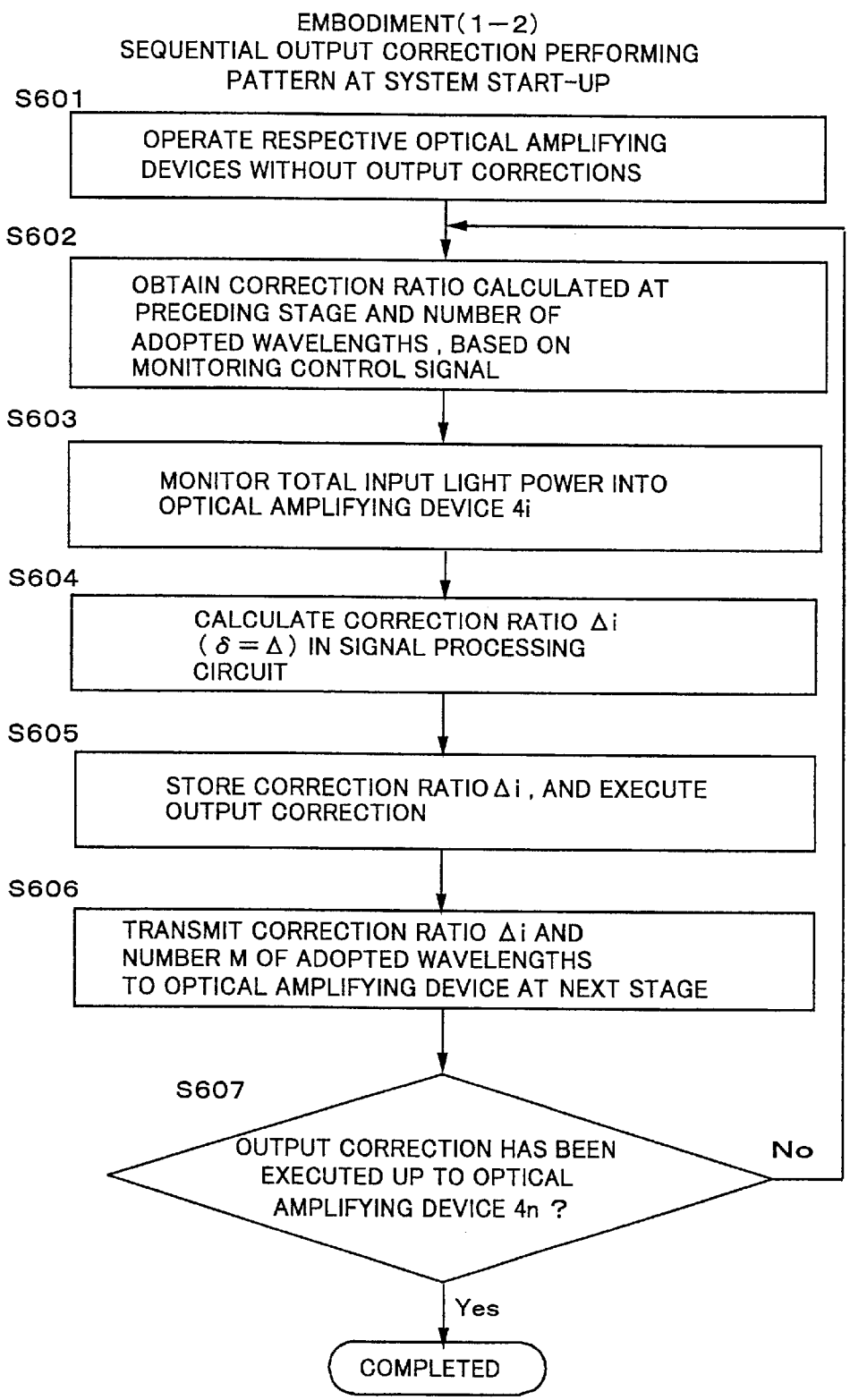

FIG.14

EMBODIMENT (1-3)
CALCULATION METHOD OF CORRECTION RATIO

S701 — SUCH AS CORRECTION RATIOS CORRESPONDING TO RESPECTIVE WAVELENGTHS AT PRECEDING STAGE AND NUMBER OF ADOPTED WAVELENGTHS ARE TRANSFERRED

S702 — OBTAIN INFORMATION OF OPTICAL AMPLIFYING DEVICE AT PRECEDING STAGE ; MONITOR TOTAL INPUT LIGHT POWER

S703 — CALCULATE RESPECTIVE CORRECTION RATIOS CORRESPONDING TO NUMBER M OF RESPECTIVE WAVELENGTHS UP TO MAXIMUM NUMBER OF WAVELENGTHS

S704 — STORE CALCULATED RESPECTIVE CORRECTION RATIOS INTO MEMORY

S705 — TRANSFER SUCH AS CALCULATED RESPECTIVE CORRECTION RATIOS TO OPTICAL AMPLIFYING DEVICE AT NEXT STAGE

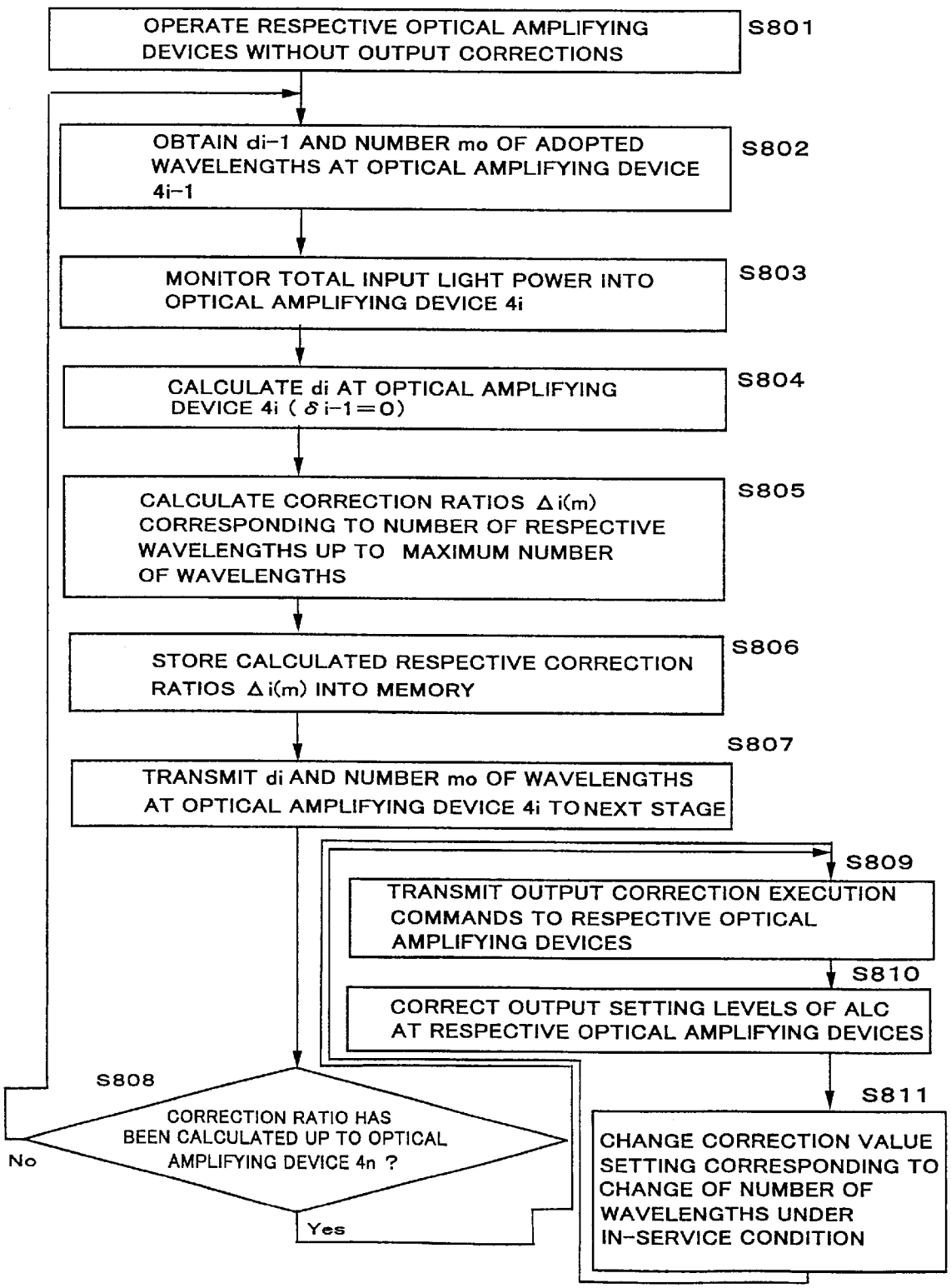

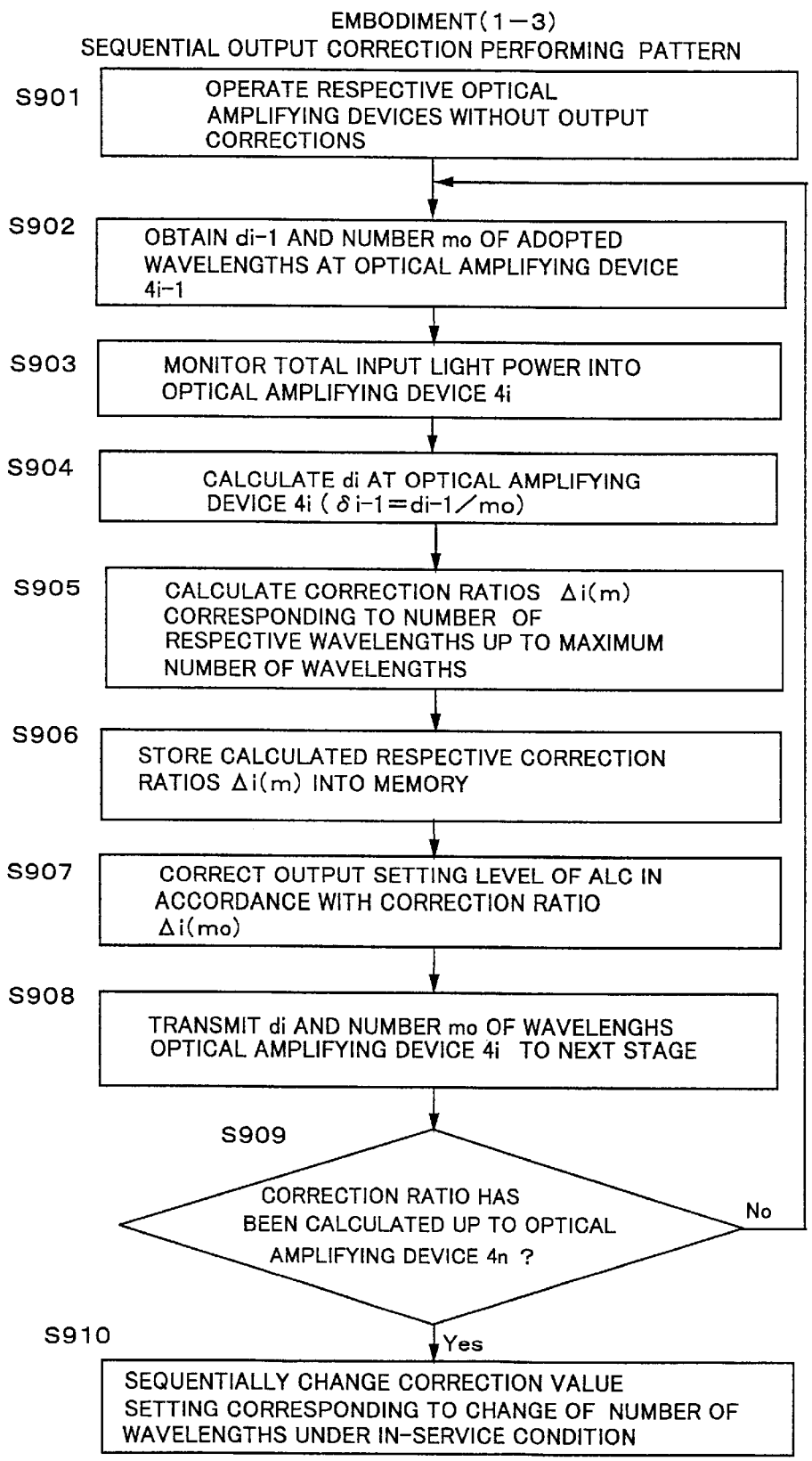

FIG.19
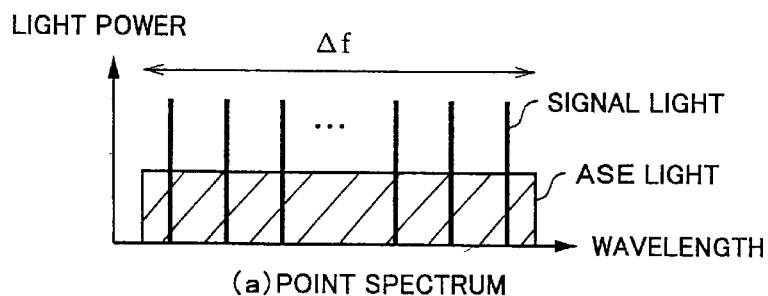
(a) POINT SPECTRUM
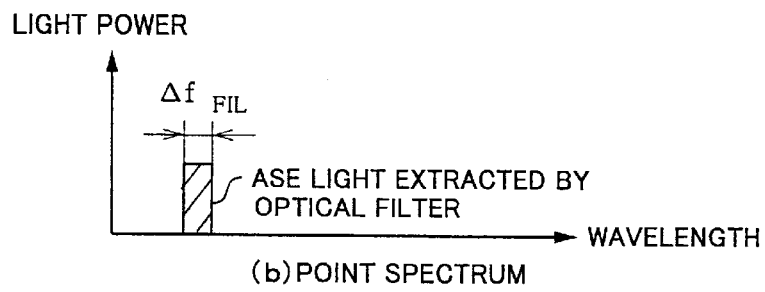
(b) POINT SPECTRUM
FIG.20
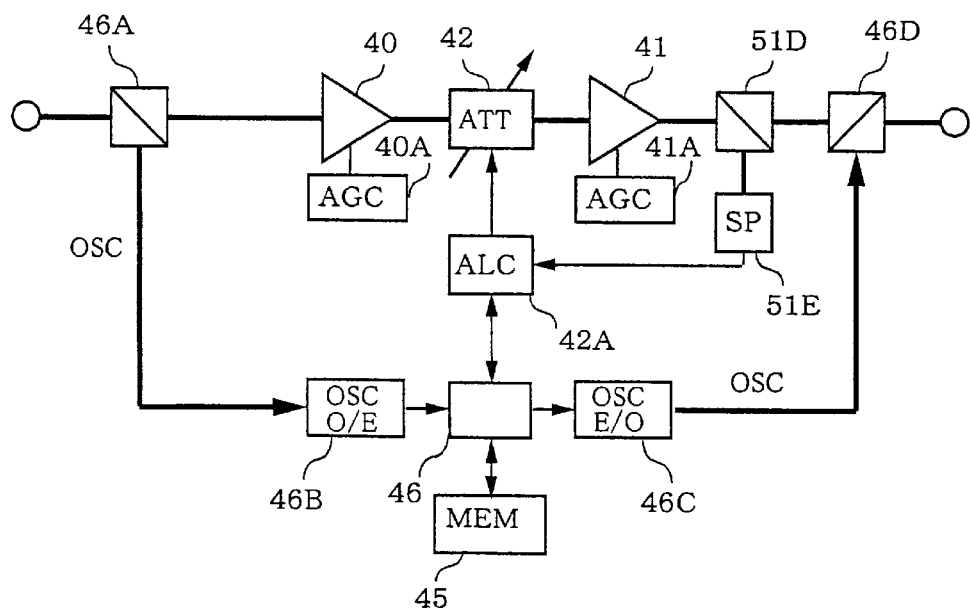

WAVELENGTH DIVISION MULTIPLEXING OPTICAL COMMUNICATION SYSTEM AND OPTICAL AMPLIFYING DEVICE

CROSS-REFERENCE TO RELATED APPLICATIONS

This application is based on, and claims priority to, Japanese patent application 11-030349, filed Feb. 8, 1999, in Japan, and which is incorporated herein by reference.

This application is related to U.S. Pat. No. 5,995,274, issued Nov. 30, 1999, and U.S. Pat. No. 5,966,237, issued Oct. 12, 1999.

This application is related to U.S. patent application Ser. No. 08/655,027, filed May 28, 1996, and which is incorporated herein by reference.

This application is related to U.S. patent application Ser. No. 09/339,258, filed Jun. 24, 1999, and which is incorporated herein by reference.

This application is related to U.S. patent application Ser. No. 08/845,847, filed Apr. 28, 1997, and which is incorporated herein by reference.

This application is related to U.S. patent application Ser. No. 08/328,368, filed Jun. 9, 1999, and which is incorporated herein by reference.

This application is related to U.S. patent application Ser. No. 08/362,120, filed Jul. 28, 1999, and which is incorporated herein by reference.

BACKGROUND OF THE INVENTION

1. Field of the Invention

The present invention relates to a wavelength division multiplexing optical communication system and an optical amplifying device, for transmitting wavelength division multiplexed signal light including a plurality of optical signals of different wavelengths while amplifying the optical signals by the optical amplifying device, and more particularly to a wavelength division multiplexing optical communication system and an optical amplifying device in which signal light power per one wavelength to be output from the optical amplifying device is kept constant.

2. Related Art

It has been recently demanded to increase a capacity of optical communication system, with popularization such as of Internet and image transmission. To cope therewith, a wavelength division multiplexing (WDM) optical communication system has been put to practical use, and there has been promoted development such as increase of the number of wavelength division multiplexing.

FIG. 21 is a block diagram showing a general constitution of a WDM optical communication system for performing multi-repeating transmission, by collectively amplifying WDM signal light by an optical amplifying device.

The system in FIG. 21 is constituted of a transmitting side terminal station 1, a receiving side terminal station 2, an optical fiber transmission path 3 for connecting them with each other, and a plurality of (in the figure, two) optical amplifying devices 4 (optical repeating stations) provided on the way of the optical fiber transmission path 3.

The transmitting side terminal station 1 includes: a plurality of optical transmitters (E/O) 1A for outputting a plurality of optical signals of different wavelengths, respectively; a multiplexer 1B for wavelength division multiplexing the plurality of optical signals, and for outputting them as WDM signal light onto the optical fiber transmission path 3; and a post-amplifier 1C for amplifying the WDM signal light to a required level. The receiving side terminal station 2 includes: a preamplifier 2A for amplifying the WDM signal light transmitted through the optical fiber transmission path 3, to a required level; a demultiplexer 2B for dividing light output from the pre-amplifier 2A into a plurality of optical signals corresponding to respective wavelengths; and a plurality of optical receivers (O/E) 2C for receiving and processing the plurality of optical signals, respectively.

At each of the optical amplifying devices 4, the WDM signal lights transmitted through the optical fiber transmission path 3 are collectively amplified. Further, at each of the optical amplifying devices 4, total power of output light is monitored, and there is conducted an automatic level control (ALC) for controlling the operation of optical amplifying device 4 so as to keep a monitored value constant. By rendering an output controlling method of optical amplifying device 4 to be ALC in this way, repeating gain becomes independent for each span, thereby advantageously resulting in readiness of system design.

In constituting a WDM optical communication system making use of a plurality of optical amplifying devices 4 as described above, there is generally restricted a transmission distance of WDM signal light due to "wavelength dependency of gain" (gain deviation) of each of optical amplifying devices 4. As an optical amplifying device effective for suppressing such wavelength dependency of gain, the present applicant has proposed a constitution such as disclosed in OAA'98, WA2, pp.173–176, and OAA'98, MD1, pp.54–57.

Such an optical amplifying device effective for suppressing wavelength dependency of gain adopts a basic constitution wherein there is provided a two-stage constitution including an optical amplifying section of preceding stage and an optical amplifying section of succeeding stage, and a variable optical attenuator is inserted at a middle stage. In such an optical amplifying device, there is realized the ALC of output light, by operating the respective optical amplifying sections of preceding and succeeding stages under an automatic gain control (AGC) to thereby suppress gain deviation, and by simultaneously controlling an optical attenuation amount of the variable optical attenuator of middle stage corresponding to an output light level of the optical amplifying section of succeeding stage. Further, output setting level of ALC in the above optical amplifying device is controlled such that output light power per one wavelength is kept at a constant value even when the number of used wavelengths is changed. Concretely, the output setting level of ALC is set at m×Po, assuming that the number of used wavelengths is m and the output light power per one wavelength is Po. The number m of used wavelengths is obtained such as by a monitoring control signal to be sent from for example a monitoring system. By controlling the output setting level in this way, the WDM optical communication system becomes possible to operate as a system even when the number of used wavelengths is changed from one wavelength up to a maximum number of wavelengths.

Meanwhile, there exists an upper limit value for output light power per one wavelength which is allowed to be sent from an optical amplifying device onto an optical fiber transmission path. This upper limit value is determined due to nonlinear effect (such as self phase modulation (SPM) and cross phase modulation (XPM) of an optical fiber transmission path). In a conventional WDM optical communication system, output light power Po per one wavelength of an optical amplifying device has been designed to be a value close to such an upper limit value.

There will be now described light to be output from an optical amplifying device, in detail.

In a general optical amplifying device, there is caused spontaneous emission light (ASE light) as input signal light is amplified, and this ASE light is added to the signal light to be output. When the optical amplifying device is ALC operating such that output light power per one wavelength becomes a predetermined value Po [W], total output light power $P_{Tout}$ [W] to be output from the optical amplifying device is given by the following equation (1):

$$P_{Tout} = M \cdot Po = P_{Tin} \cdot G + 2 \cdot n_{sp} \cdot h\nu \cdot \Delta f \cdot (G-1) \quad (1)$$

wherein: $P_{Tin}$ is total input light power [W] to the optical amplifying device; G is a gain of the optical amplifying device; $n_{sp}$ is a spontaneous emission coefficient of the optical amplifying device; hv is a photon energy [J]; and $\Delta f$ is a bandwidth [Hz] of the optical amplifying device.

In the equation (1), the first term of right side represents a signal light component (when input light includes ASE light such as at an optical amplifying device of a preceding stage, including an amplified component of the ASE light,), and the second term represents an ASE light component caused at the above-mentioned optical amplifying device. The total output light power $P_{Tout}$ is controlled to be constant in an optical amplifying device which performs an ALC operation. Thus, when separately considering output light power Po per one wavelength by dividing it into a signal light component and an ASE light component, the ASE light component (the second term of the equation (1)) is an error component relative to a signal light component to be controlled to a constant level corresponding to the aforementioned upper limit value. Namely, the output light power Po per one wavelength can be represented by the following equation (2) derived from the equation (1):

$$Po = P_{Tin} \cdot G/m + 2 \cdot n_{sp} \cdot h\nu \cdot \Delta f \cdot (G-1)/m = P_{Tin} \cdot G/m + \Delta Po \quad (2)$$

wherein $\Delta Po = 2 \cdot n_{sp} \cdot h\nu \cdot \Delta f \cdot (G-1)/m$ [W].

As described above, signal light power per one wavelength is decreased by $\Delta Po$ than a predetermined level of output light power Po. Thus, in a WDM optical communication system as described above, there is such a problem that input signal light power to an optical amplifying device of next stage is decreased whenever WDM signal light is repeated and amplified at an optical amplifying device, resulting in degradation of optical S/N ratio at a receiving side terminal station. This optical S/N ratio represents a ratio of signal light and noise light (ASE light). Further, there is generally required an optical S/N ratio equal to or greater than a certain value, in order to achieve a predetermined code error rate at an optical receiver. The following equation (3) gives an optical S/N ratio when repeat and amplification is performed by optical amplifying devices of n stages:

$$1/OSNR = 1/OSNR_1 + 1/OSNR_2 + \ldots + 1/OSNR_n \, OSNR_i = P_{insig(i)} / (2 \cdot n_{sp(i)} \cdot h\nu \cdot \Delta f) \quad (3)$$

wherein: OSNR is an optical S/N ratio after passing through an n-th optical amplifying device; $OSNR_i$ is an optical S/N ratio when an i-th optical amplifying device is used alone; $P_{insig(i)}$ is input signal light power into the i-th optical amplifying device; and $n_{sp(i)}$ is a spontaneous emission coefficient of the i-th optical amplifying device.

As apparent from the equation (2), as the number m of wavelengths is decreased, the reduction amount $\Delta Po$ of signal light power per one wavelength is increased and has a larger effect on transmission characteristics. As an example, there has been obtained such an information that: in case of five-stage repeating, signal light power is only reduced by 0.5 dB upon usage of 32 wavelengths, whereas signal light power is reduced by as much as 12.3 dB upon usage of 1 wavelength . Generally, since an optical amplifying device used in a WDM optical communication system has broad-band characteristics, reduced amount of signal light power due to ASE light becomes significant upon usage of one wavelength.

To cope with such reduction of signal light power in case of a small number of used wavelengths, it is conceivable to perform a system design by for example previously estimating degradation of optical S/N ratio at the time of operation at a small number of wavelengths. However, in this case, there is caused such a problem that a system gain is reduced to thereby decrease a transmittable distance.

SUMMARY OF THE INVENTION

The present invention has been carried out in view of the conventional problems as described above, and it is therefore an object of the present invention to provide a WDM optical communication system and an optical amplifying device, adapted to prevent reduction of signal light power per one wavelength when repeating and transmitting WDM signal light making use of an ALC-operation optical amplifying device, to thereby achieve the improvement of transmission characteristic.

To achieve the above object, a wavelength division multiplexing optical communication system according to the present invention, including at least one optical amplifying device capable of collectively amplifying wavelength division multiplexed signal light; wherein output light of the optical amplifying device is controlled to be a predetermined output setting level; and wherein the wavelength division multiplexing optical communication system further comprises: a signal light output power controlling device for controlling an operation of the optical amplifying device so that signal light power per one wavelength included in the output light of the optical amplifying device is kept constant irrespectively of the number of wavelengths of signal light.

With the WDM optical communication system having such a constitution, the signal light power per one wavelength included in the output light of the ALC operating optical amplifying device, is kept constant by the signal light output power controlling device irrespectively of the number of wavelengths of the signal light, so that the signal light power of each wavelength is never reduced even when the WDM signal light is repeated and amplified via the optical amplifying devices, to thereby obtain excellent transmission characteristics.

As a first aspect of the WDM optical communication system, the signal light output power controlling device may comprise: an input light measuring section for measuring input light power of the optical amplifying device; a correction value calculating section for obtaining a noise light power caused at the optical amplifying device, based on: the input light power measured at the input light measuring section, a noise figure of the optical amplifying device corresponding to the input light power thereof, a bandwidth of the optical amplifying device, and the number of wavelengths of the signal light, so as to calculate an output correction value for increasing the output setting level of the optical amplifying device by the noise light power; and a correction executing section for executing a correction for the output setting level of the optical amplifying device, in accordance with the output correction value calculated by the correction value calculating section.

According to such a constitution, the correction value calculating section calculatingly obtains the noise light power caused at the optical amplifying device based on the input light power into the optical amplifying device obtained at the input light measuring section, the respective characteristics of the optical amplifying device and the number of wavelengths of the signal light; to thereby calculate the output correction value for increasing the output setting level of the optical amplifying device by the noise light power. Further, in accordance with the calculated output correction value, the correction executing section executes the correction of the output setting level so that the signal light power per one wavelength included in the output light of the optical amplifying device is kept constant irrespectively of the number of wavelengths.

As a concrete constitution of the first aspect, the input light measuring section and the correction executing section may be provided for each of a plurality of optical amplifying devices; and the correction value calculating section may be provided in the number of at least one for the plurality of optical amplifying devices; so as to collectively calculate the output correction values for the respective optical amplifying devices based on input light power, noise figure, bandwidth, and the number of wavelengths of the signal light, transmitted from each of the plurality of optical amplifying devices, to notify the thus calculated output correction values to the correction executing sections of the corresponding optical amplifying devices, respectively.

According to such a constitution, the output correction values for the plurality of optical amplifying devices can be collectively calculated by the correction value calculating section of such as a central station.

As another concrete constitution of the first aspect, the signal light output power controlling device may be provided for each of a plurality of optical amplifying devices; and each of correction value calculating sections of respective signal light output power controlling devices may be constituted to calculate an output correction value for the associated optical amplifying device, based on: an output correction value for an optical amplifying device at a preceding stage, and;

an input light power measured at the associated input light measuring section for the associated optical amplifying device, a noise figure and a bandwidth corresponding to the input light power, and the number of wavelengths of the signal light; so as to notify the thus calculated output correction value to the associated correction executing section, and to simultaneously transmit the thus calculated output correction value to a correction value calculating section of an optical amplifying device at a succeeding stage; so that output correction values are set sequentially from the optical amplifying device at an optical transmitting station side to the optical amplifying device at an optical receiving station side. According to such a constitution, the output correction values for the plurality of optical amplifying devices are calculated at the respective correction value calculating sections sequentially from the optical amplifying device at the optical transmitting station side.

Further, as a concrete constitution as modification of the first aspect, the signal light output power controlling device may comprise: a correction value storing section for storing output correction values which have been previously calculated corresponding to a combination of: the number of wavelengths of signal light which are predictable in the system, and the stage number of the applicable optical amplifying device from an optical transmitting station side; a setting notification section for notifying information concerning the number of wavelengths of the signal light at present and the stage number of the optical amplifying device from the optical transmitting station side, to the optical amplifying device; and a correction executing section for reading out the output correction value corresponding to the information from the setting notification section, from the correction value storing section, so as to execute a correction in accordance with the thus read out output correction value for the output setting level of the optical amplifying device.

According to such a constitution, the output correction values of the optical amplifying devices are previously calculated corresponding to a combination of: the number of wavelengths of signal light which are predictable in the system, and the stage number of the applicable optical amplifying device from an optical transmitting station side; and stored in the correction value storing section such as in a form of two-dimension correction value table. Further, the information concerning the number of wavelengths of the signal light at present and the stage number of the optical amplifying device from the optical transmitting station side, is notified from the setting notification section to the optical amplifying device, and the output correction value corresponding to the information is read out from the correction value storing section by the correction executing section, so as to execute the output correction. In this way, there is achieved simplification of the calculation processing for the output correction value.

As a second aspect of the aforementioned WDM optical communication system, the signal light output power controlling device may comprise: an optical measuring section capable of measuring at least one of: signal light power per one wavelength to be output from the optical amplifying device; and noise light power caused at the optical amplifying device; and a correction executing section for executing a correction of an output setting level of the optical amplifying device, based on the measuring result of the optical measuring section.

According to such a constitution, the signal light power per one wavelength to be output from the optical amplifying device or the noise light power caused at the optical amplifying device is actually measured by the optical measuring section, and the output setting level of the optical amplifying device is corrected based on an actual measuring result, so that the signal light power per one wavelength included in the output light of the optical amplifying device is kept constant irrespectively of the number of wavelengths.

As a concrete constitution of the second aspect, the optical measuring section may detect noise light power caused at the optical amplifying device, and the correction executing section may execute a correction for increasing the output setting level of the optical amplifying device by the detected noise light power. Alternatively, the optical measuring section may measure a spectrum of the output light of the optical amplifying device to thereby detect averaged signal light power per one wavelength included in the output light, and the correction executing section may correct the output setting level of the optical amplifying device so that the signal light power becomes a constant value.

Further, the optical amplifying device according to the present invention capable of collectively amplifying wavelength division multiplexed signal light of which output light is controlled to be a predetermined output setting level, comprises: a signal light output power controlling device for controlling the optical amplifying operation so that signal light power per one wavelength included in the output light is kept constant irrespectively of the number of wavelengths of signal light.

According to the optical amplifying device having such a constitution, the signal light power per one wavelength included in the output light under an ALC operation, is kept constant by the signal light output power controlling device, irrespectively of the number of wavelengths of the signal light. By applying such an optical amplifying device to a WDM optical communication system, the signal light power of each wavelength is never reduced even when the WDM signal light is repeated and amplified, to thereby obtain excellent transmission characteristics.

Further objects, features and advantages of the present invention will become more apparent from the following description of preferred embodiments when read in conjunction with the accompanying drawings.

BRIEF DESCRIPTION OF THE DRAWINGS

FIG. 6 is a flowchart showing a correction performing method when a simultaneous output correction performing pattern is applied at the time of system start-up, for the embodiment (1-1);

FIG. 7 is a flowchart showing a correction performing method when a sequential output correction performing pattern is applied at the time of system start-up, for the embodiment (1-1);

FIG. 8 is a flowchart showing a correction performing method when a simultaneous output correction performing pattern is applied under an in-service condition, for the embodiment (1-1);

FIG. 9 is a flowchart showing a correction performing method when a sequential output correction performing pattern is applied under an in-service condition, for the embodiment (1-1);

FIG. 13 is a flowchart showing a correction performing method when a sequential output correction performing pattern is applied at the time of system start-up, for the embodiment (1-2);

FIG. 14 is a flowchart showing a basic calculation method of a correction ratio in an embodiment (1-3);

FIG. 15 is a flowchart showing a correction performing method when a simultaneous output correction performing pattern is applied, for the embodiment (13);

FIG. 16 is a flowchart showing a correction performing method when a sequential output correction performing pattern is applied, for the embodiment (1-3);

FIG. 19 is a diagram showing characteristics of an optical filter adopted in the embodiment (2-1);

FIG. 20 is a block diagram showing an example of a specific constitution of an optical amplifying device adopted in an embodiment (2-2)

DETAILED DESCRIPTION OF THE INVENTION

There will be described hereinafter the embodiments according the present invention, with reference to the accompanying drawings. Throughout the drawings, substantially identical parts are attached with identical numerals, respectively.

Figure 1:
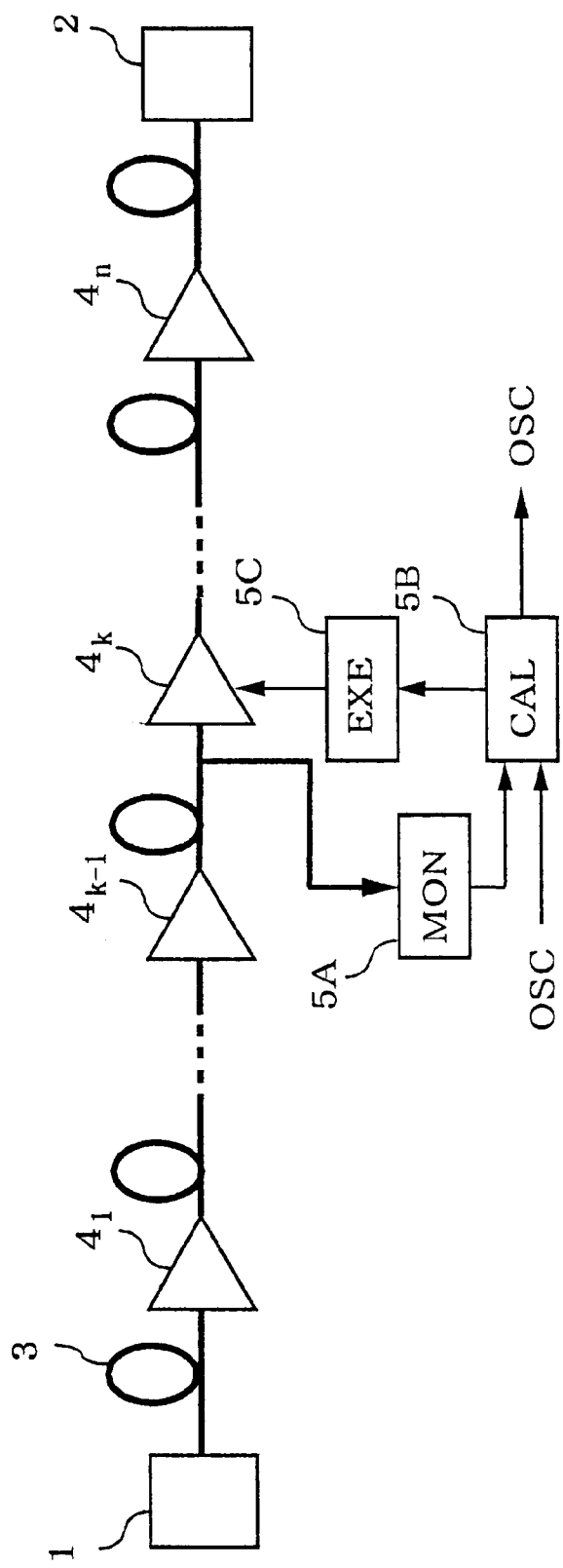
FIG. 1 is a block diagram showing a first basic constitution of a WDM optical communication system according to the present invention.

FIG. 1 is a block diagram showing a first basic constitution of a WDM optical communication system according to the present invention.

Figure 21:
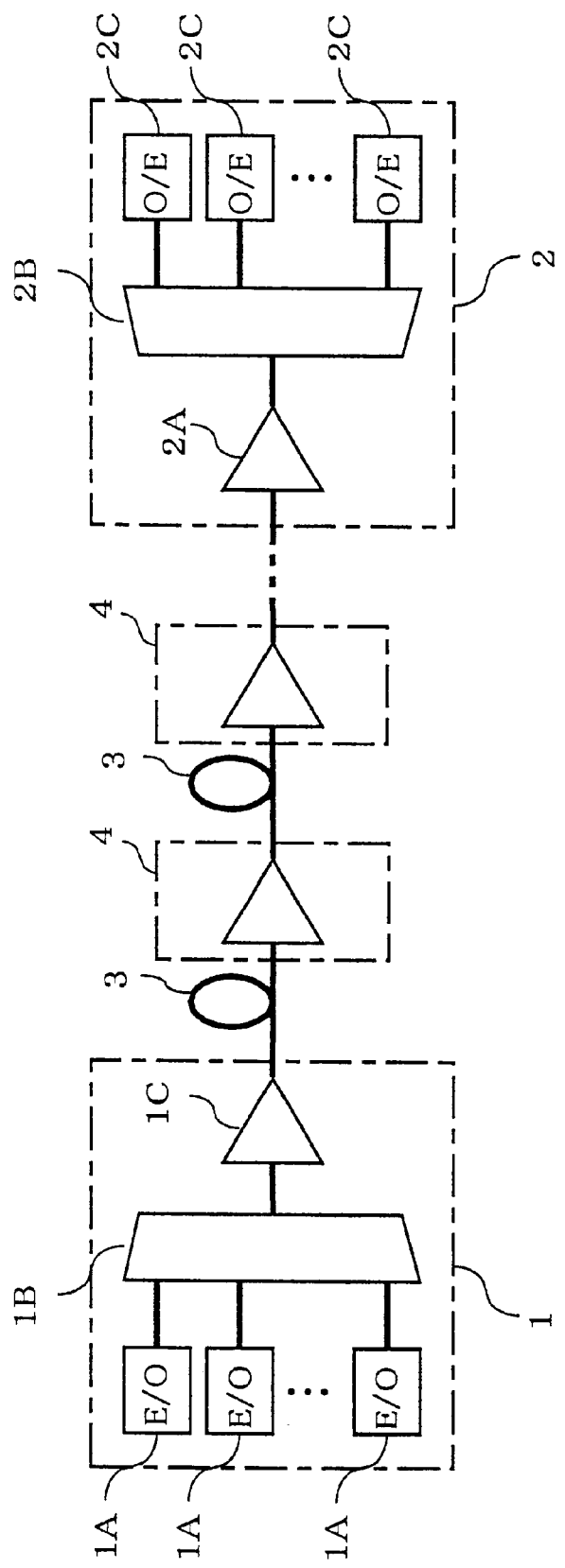
FIG. 21 is a block diagram showing a constitution of a general WDM optical communication system.

In FIG. 1, similarly to the conventional system shown in FIG. 21, the present WDM optical communication system includes terminal stations 1 and 2 at transmitting and receiving sides, an optical fiber transmission path 3 for connecting them with each other, and a plurality of optical amplifying devices (optical repeating stations) $4_1$ through $4_n$ provided on the way of the optical fiber transmission path 3. The present system has a feature in that there is performed an output correction for increasing a setting level of output light corresponding to an ASE light component, based on calculation at each of the optical amplifying devices $4_1$ through $4_n$. In FIG. 1, there is shown an outline of an output correction for an optical amplifying device $4_k$ only. However, there is also performed an output correction identical with that in the optical amplifying device $4_k$, in each of other optical amplifying devices.

The basic constitution for realizing output correction for the optical amplifying device $4_k$ includes an input light measuring section (MON) 5A, a correction value calculating section (CAL) 5B and a correction executing section (EXE) 5C. The input light measuring section 5A measures total power of input light into the optical amplifying device $4_k$, to notify a result to the correction value calculating section 5B. The correction value calculating section 5B calculates an output correction value to be described later, making use of: an output correction value at an optical amplifying device $4_{k-1}$ (repeating station at a preceding stage); and input light power, a noise figure, a bandwidth and the number of used wavelengths at the optical amplifying device $4_k$. The output correction value at the preceding stage to be input into the correction value calculating section 5B is provided such as by a monitoring control (OSC) signal to be sent from a monitoring system. Further, the noise figure and the bandwidth of the applicable station shall be previously settled such as by a memory (not shown), and the number of used wavelengths may be provided such as by the monitoring control signal or may be monitored by the applicable station itself. The calculated output correction value is sent to the correction executing section 5C where correction of an output setting level for the optical amplifying device $4_k$ is performed, and the calculated output correction value is also transmitted to an optical amplifying device of a succeeding stage via monitoring control signal.

There is now described a calculation method of an output correction value for each of the optical amplifying devices $4_1$ through $4_n$.

Firstly considering an output correction value at the optical amplifying device $4_1$ of a first stage, total output light power (signal light+ASE light) $P_{Tout(1)}$ [W] before correction and total output light power (signal light+ASE light) $P_{Tout(1)}'$ [W] after correction are given by the following equations (4) and (5), respectively:

$$P_{Tout(1)} = m \cdot Po = m \cdot P_{insig(1)} \cdot G_1 + 2h\nu \cdot n_{sp(1)} \cdot \Delta f \cdot (G_1 - 1) \quad (4)$$

$$P_{Tout(1)}' = P_{Tout(1)} + \Delta P_{out(1)} = m \cdot P_{insig(1)} \cdot G_1' + 2h\nu \cdot n_{sp(1)} \cdot \Delta f \cdot (G_1' - 1) \quad (5)$$

wherein: $P_{insig(1)}$ is input signal light power [W] of an optical amplifying device at a first stage; $G_1$ is a gain before output correction of the optical amplifying device at the first stage; $G_1'$ is a gain after output correction of the optical amplifying device at the first stage; $n_{sp(1)}$ is a spontaneous emission coefficient of the optical amplifying device at the first stage; hv is a photon energy [J]; and $\Delta f$ is a bandwidth [Hz] of the optical amplifying device. Further, $\Delta P_{out(1)}$ shall be an output correction value at the optical amplifying device at the first stage.

Under an ALC operation, the output correction value $\Delta P_{out(1)}$ is to be added to an output value before output correction, such that signal light output power per one wavelength after correction becomes a predetermined value Po, i.e., such that $P_{Tout(1)}' = m \cdot Po = m \cdot P_{insig(1)} \cdot G_1'$. Thus, from the equation (5), the correction value $\Delta P_{out(1)}$ can be represented by the following equation (6):

$$\Delta P_{out(1)} = 2 \cdot h\nu \cdot n_{sp(1)} \cdot \Delta f \cdot (G_1' - 1) \quad (6)$$

From the above, a ratio $\Delta_1$ (hereinafter called correction ratio) of the correction value $\Delta P_{out(1)}$ relative to the total output light power $P_{Tout(1)}$ before correction can be obtained by the following equation (7):

$$\Delta_1 = \frac{\Delta P_{out(1)}}{P_{Tout(1)}} = \frac{\Delta P_{out(1)}}{m \cdot P_{insig(1)} \cdot G_1'} \quad (7)$$

$$= \frac{2 \cdot h\nu \cdot n_{sp(1)} \cdot \Delta f \cdot (G_1' - 1)}{m \cdot P_{insig(1)} \cdot G_1'}$$

$$\approx \frac{2 \cdot h\nu \cdot n_{sp(1)} \cdot \Delta f}{m \cdot P_{insig(1)}} \text{ (wherein } G_1' \gg 1\text{)}$$

There will be considered an output correction value at each of the optical amplifying devices $4_2$ through $4_n$ after a second stage and so forth.

At the optical amplifying device of the second stage, it is required to increase an output level by an amount of the correction value of the optical amplifying device at the preceding stage, even if the optical amplifying device of the second stage causes no ASE light. Actually, since ASE light is also caused at the optical amplifying device of the second stage, a correction value amount corresponding thereto is also added. As such, a correction ratio $\Delta_2$ of the optical amplifying device $4_2$ of the second stage can be represented by the following equation (8):

$$\Delta_2 = \frac{\Delta P_{out(2)}}{P_{Tout(2)}} = \Delta_1 + \frac{2 \cdot h\nu \cdot n_{sp(2)} \cdot \Delta f}{m \cdot P_{insig(2)}} \quad (8)$$

Further, a correction ratio $\Delta_k$ of an optical amplifying device $4_k$ at a k-th stage can be represented by the following equation (9), similarly to the above:

$$\Delta_k = \Delta_{k-1} + \frac{2 \cdot h\nu \cdot n_{sp(k)} \cdot \Delta f}{m \cdot P_{insig(k)}} \quad (9)$$

$$= \sum_{i=1}^{k} \frac{2 \cdot h\nu \cdot n_{sp(i)} \cdot \Delta f}{m \cdot P_{insig(k)}}$$

Here, it is generally known that a spontaneous emission coefficient $n_{spk}$ and input signal light power $P_{insig(k)}$ of the optical amplifying device $4_k$ can be given by the following equations (10) and (11):

$$n_{sp(k)} = \frac{1}{2} \times 10^{\frac{NF_k}{10}} \quad 10\log(P_{insig(k)}) \quad (10)$$

$$= 10\log\left(\frac{P_{Tin(k)}}{m}\right) - 10\log(1 + \delta_{k-1}) \quad (11)$$

wherein $NF_k$ is a noise figure NF [dB] of an optical amplifying device at a k-th stage, and $P_{Tin(k)}$ is a total input light power of the optical amplifying device at the k-th stage. Further, $\delta_{k-1}$ represents an output correction value (value being performed) of the optical amplifying device $4_{k-1}$ at the preceding stage at the time of measuring input light power.

It is noted that the output correction value $\delta_{k-1} = \Delta_{k-1}$, when: an output correction value of the k-th optical amplifying device itself is calculated, after performing an output correction for an optical amplifying device at a preceding stage. Contrary, $\delta_{k-1} = 0$ when: an output level of each of optical amplifying devices is set, after calculating an output correction value of each of optical amplifying devices to thereby calculate output correction values of all optical amplifying devices before performing an output correction of preceding stage. The details thereof will be described later.

By rewriting the equation (9) making use of equations (10) and (11), correction ratio $\Delta_k$ at the optical amplifying device $4_k$ is given by the following equation (12):

$$\Delta_k = \Delta_{k-1} + \frac{h\nu \cdot \Delta f}{m} \cdot 10^{\frac{NF_k - 10\log\left(\frac{P_{Tin(k)}}{m}\right) + 10\log(1 + \delta_{k-1})}{10}} \quad (12)$$

Further, there will be described a specific example hereinafter, in which an actual usage condition of the optical amplifying device is supposed for the equation (12).

When a wavelength band for WDM signal light to be transmitted is assumed such as at 1.55 μm, photon energy hv is represented such that $h\nu = 1.28 \times 10^{-19}$ [J], making use of the Planck's constant $h = 6.63 \times 10^{-34}$ [Js]. Further, because light power input into an optical amplifying device is frequently monitored at a dBm unit, the following equation is obtained by converting total input light power $P_{Tin(k)}$ from a W unit into a dBm unit:

$$P_{Tin(k)d} = 10 \log P_{Tin(k)} + 30,$$

wherein $P_{Tin(k)d}$ is total input light power [dBm] of the optical amplifying device at a k-th stage. Further, the following relationship is established for a bandwidth $\Delta f$ of an optical amplifying device at a 1.55 μm band, when converted from a Hz unit into an nm unit:

$$\Delta f = c/\lambda^2 \Delta F' = 1.25 \times 10^{20} \Delta F' = 1.25 \times 10^{11} \Delta F$$

wherein c is a light velocity [m/s], λ is a used wavelength [m], ΔF is a bandwidth of an optical amplifying device represented in a "m" unit, and ΔF is a bandwidth of an optical amplifying device represented in an "nm" unit.

By rearranging the equation (12) making use of these relationships, correction ratio $\Delta_k$ at the optical amplifying device $4_k$ can be concretely represented by the following equation (13):

$$\Delta_k = \Delta_{k-1} + 10^{\frac{NF_k - P_{Tin(k)d} + 10\log(m) + 10\log(\delta_{k-1}+1) - 47.9}{10}} \times \frac{\Delta F}{m}. \quad (13)$$

When an output setting level of ALC at the optical amplifying device $4_k$ is given at a dBm unit, output correction can be performed by increasing the output setting level by $10 \log(1+\Delta_k)$. Further, when there has been substantially established input light power, a noise figure or a bandwidth for the optical amplifying device $4_k$, a correction ratio may be calculated by giving a fixed value corresponding to the substantially established one, to either of the equation (12) or (13).

There will be described hereinafter a method for performing an output correction at each of the optical amplifying devices $4_1$ through $4_n$.

Basically, it is possible to separately consider methods for performing output correction of a plurality of optical amplifying devices in a WDM optical communication system: about a method at the time of system start-up; and about a method in which a correction value is re-calculated and reflected corresponding to a change in the number of used wavelengths under an in-service condition where WDM signal light is being repeated and transmitted. Further, there can be thought of at least two patterns for each case. Namely, such two are: a pattern wherein output corrections are simultaneously performed for all of optical amplifying devices, after output correction values of optical amplifying devices are calculated, respectively (hereinafter called "simultaneous output correction performing pattern"); and a pattern wherein calculation of output correction value and execution thereof are sequentially performed from an upstream side (transmitting side) toward a downstream side (receiving side) (hereinafter called "sequential output correction performing pattern"). There will be hereinafter described basic operations of the respective performing patterns.

In a simultaneous output correction performing pattern at a system start-up, the optical amplifying devices $4_1$ through $4_n$ are firstly rendered to operate, without performing any output corrections. In this state, there is simply executed calculation of output correction value in an order from an upstream optical amplifying device toward a downstream one, and the thus calculated correction values therefor are stored. Upon completion of the calculation of correction values for all of optical amplifying devices, output setting levels of the respective optical amplifying devices are simultaneously corrected in accordance with the respective correction values.

In a sequential output correction performing pattern at a system start-up, the optical amplifying device $4_1$ calculates an output correction value, and corrects an output setting level in accordance with the calculation result. Upon completion of output correction at the optical amplifying device $4_1$, the optical amplifying device $4_2$ at the second stage performs calculation of a correction value and a correction of output setting level. Thereafter, identical procedure is sequentially executed toward a downstream optical amplifying device.

In a simultaneous output correction performing pattern under an in-service condition, the optical amplifying devices $4_1$ through $4_n$ are rendered to operate according to the output correction values at the present states, respectively. Under this condition, there is simply executed re-calculation of output correction value in an order from an upstream optical amplifying device toward a downstream one, and the thus calculated correction values therefor are stored. Upon completion of calculation of correction values for all of optical amplifying devices, output setting levels of the respective optical amplifying devices are simultaneously corrected in accordance with the newly calculated correction values, respectively.

In a sequential output correction performing pattern under an in-service condition, the optical amplifying device $4_1$ re-calculates an output correction value, and corrects an output setting level in accordance with the calculation result. Upon completion of output correction at the optical amplifying device $4_1$, the optical amplifying device $4_2$ at the second stage performs re-calculation of a correction value and a correction of output setting level. Thereafter, identical procedure is sequentially executed toward a downstream optical amplifying device.

Here, as a situation for re-calculation of correction value, there shall be assumed a situation where the number of used wavelengths has been changed under an in-service condition. However, not limited to such a situation, such as when the optical fiber transmission path 3 is laid aerially since the loss of the optical fiber transmission path 3 is apt to vary under influence such as due to seasonal temperature change, it is desirable to additionally re-calculate and reestablish an output correction value corresponding to input light power at that time at intervals of a constant period of time. Whenever the input light power of each of optical amplifying devices has deviated, from a value at the time the output correction value was calculated, by a certain value or more, it is further possible to re-calculate and reestablish an output correction value corresponding to input light power at that time.

In the way as described above, the output corrections for optical amplifying devices $4_1$ through $4_n$ are performed, to thereby fixingly control signal light power per one wavelength included in output light of each of the optical amplifying devices $4_1$ through $4_n$.

As a specific example, there will be described hereinafter transmission characteristics of a WDM optical communication system in which optical amplifying devices are connected in a six stage manner via optical fiber transmission path having a loss of transmission path of 25 dB, in which each of the optical amplifying devices has, before correction, an output light setting level of 0 dBm/ch, a noise figure of 7 dB, and a bandwidth of 30 nm.

It is assumed here that there do not exist such as gain deviation of respective optical amplifying devices and tilt of optical fiber transmission path, for simplification of description. In practice, however, there occur deviations of signal light power among wavelengths such as due to gain deviations of optical amplifying devices. Nonetheless, even such a case can be treated identically with a case to which the above assumption is applied, by considering an averaged value of signal light power of each wavelength.

Figure 2:
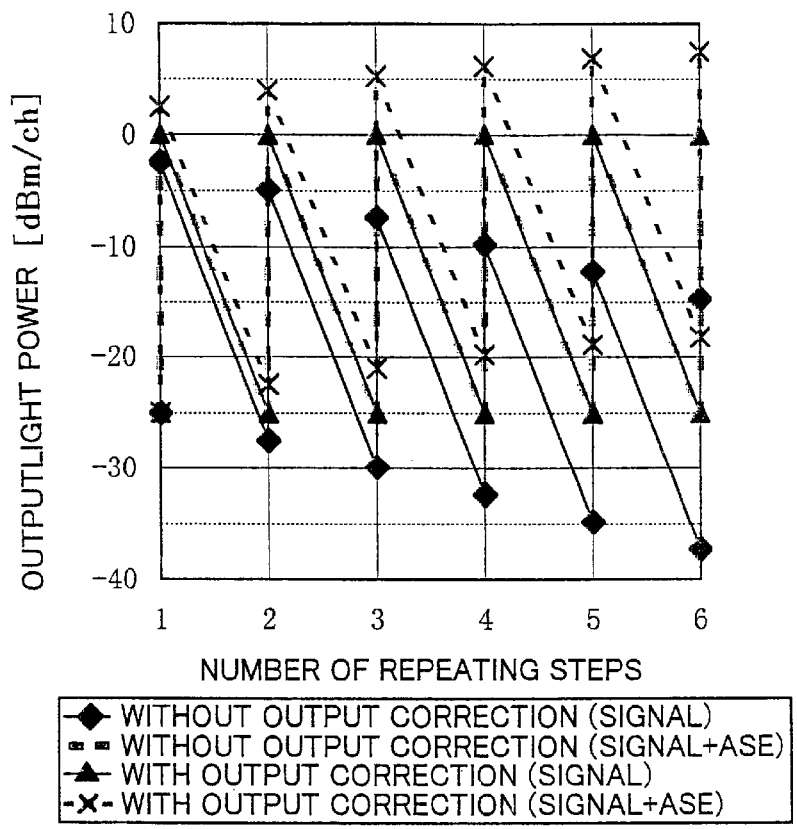
FIG. 2 is a level diagram showing a change in light power per one wavelength to be output from each of optical amplifying devices of the WDM optical communication system having the first basic constitution.

FIG. 2 is a level diagram showing a change in light power per one wavelength to be output from each of optical amplifying devices, corresponding to presence or absence of output correction. The abscissa represents the number of repeating steps of optical amplifying devices, and the ordinate represents output light power per one wavelength [dBm/ch].

As shown in FIG. 2, in case of presence of output correction, the output light power (mark "X" in this figure) as a sum of signal light and ASE light increases as the number of repeating steps is increased. Nonetheless, paying attention to the power (mark "▼A" in this figure) only of signal light included in output light, it can be seen that this power is controlled to be a constant level (0 dBm/ch) at an output of each of the optical amplifying devices. As compared thereto, in case of absence of correction, i.e., similarly to the conventional system, the signal light power (mark "♦" in this figure) included in output light is reduced as the number of repeating steps is increased. This is because the output light power as a sum of signal light and ASE light is controlled to be constant.

Figure 3:
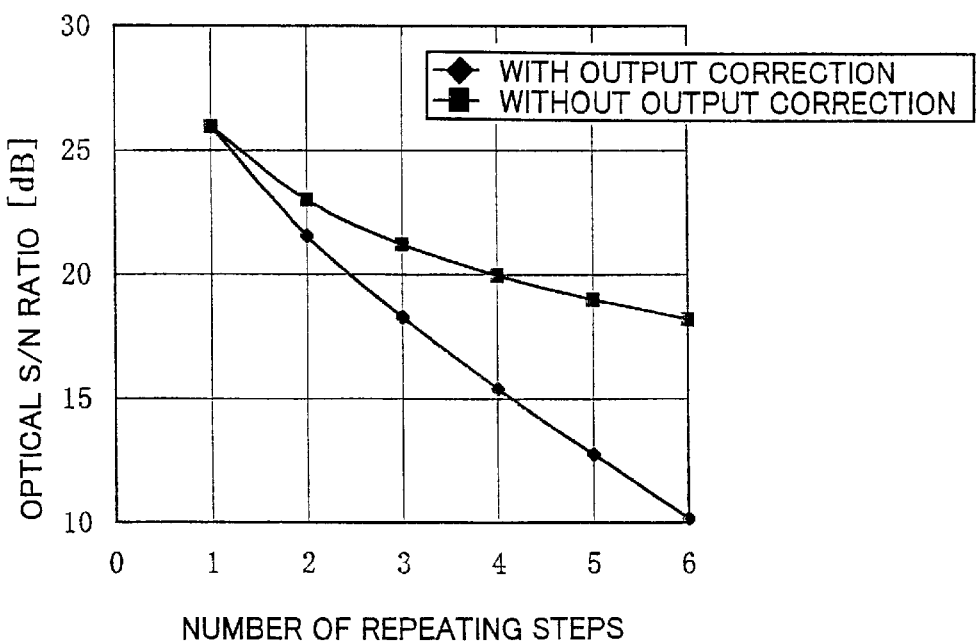
FIG. 3 is a diagram showing a change in optical S/N ratio for each of optical amplifying devices of the WDM optical communication system having the first basic constitution.

FIG. 3 is a diagram showing a change in optical S/N ratio for each of optical amplifying devices. The abscissa represents the number of repeating steps of optical amplifying devices, and the ordinate represents an optical S/N ratio [dB]. Here, the calculation is conducted by assuming that: output light power is 0 dBm/ch in case of absence of output correction; loss of transmission path is 25 dB; noise figure of optical amplifying device is 7 dB; bandwidth is 30 nm; and the number of transmission wave is one.

As shown in FIG. 3, the optical S/N ratio, which is approximately 26 dB at an output of optical amplifying device at a first stage, is degraded at an output of optical amplifying device at a sixth stage: up to as much as approximately 10 dB in case of absence of output correction (mark "♦" in this figure); and up to only approximately 18 dB in case of presence of output correction (mark "■" in this figure).

In this way, according to the WDM optical communication system having the first basic constitution, the output correction is performed for each of optical amplifying devices $4_1$ through $4_n$, to thereby keep the signal light power to be output from each of the optical amplifying devices, at a required constant value irrespectively of the number of used wavelengths, so that improvement of transmission characteristics of WDM signal light can be achieved. As a result, it becomes possible to obtain an excellent receiver sensitivity at the receiving side terminal station 2.

There will be described hereinafter a specific embodiment of a WDM optical communication system having the aforementioned first basic constitution.

Figure 4:
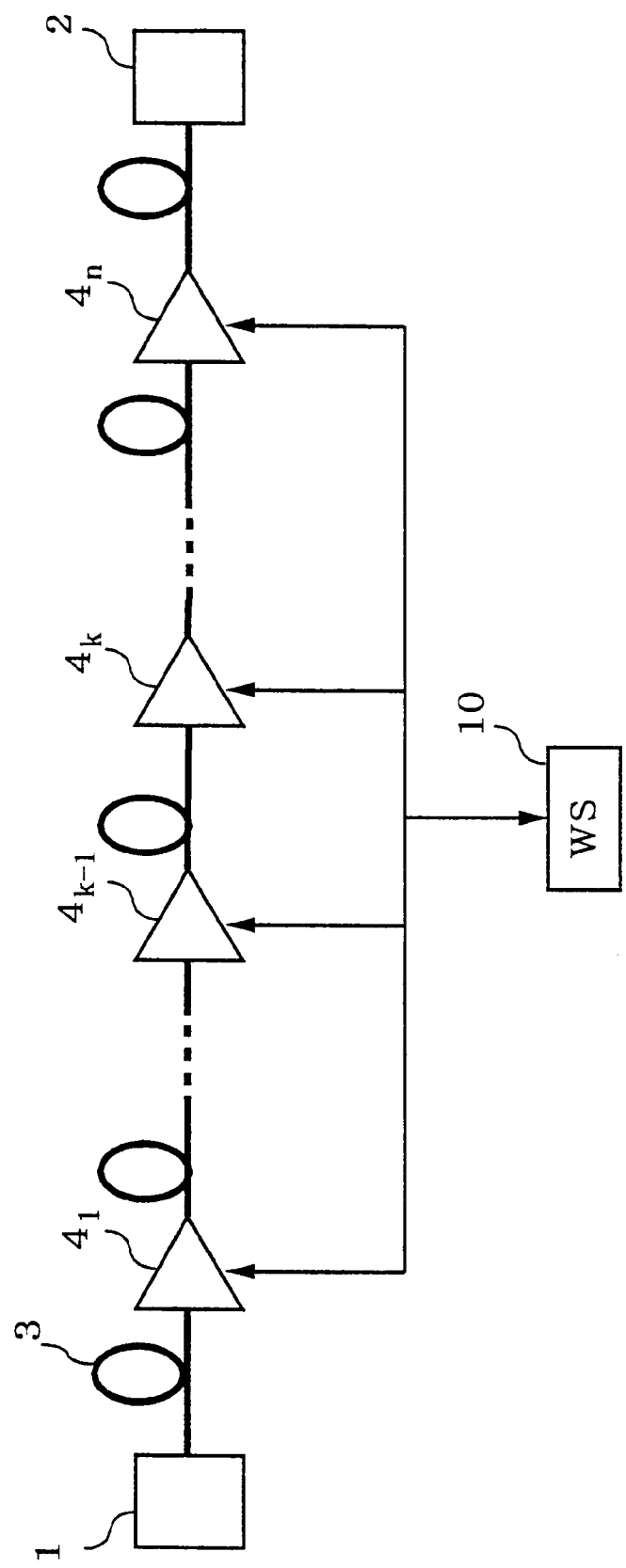
FIG. 4 is a block diagram showing a constitution of a WDM optical communication system of an embodiment (1-1)

FIG. 4 is a block diagram showing a constitution of an embodiment (1-1) applied with the first basic constitution.

The WDM optical communication system of the embodiment (1-1) is characterized by adopting a method to collectively calculate output correction values of respective optical amplifying devices, and transmit the result to the respective optical amplifying devices. Concretely, there is provided a single central station 10 for a plurality of optical amplifying devices $4_1$ through $4_n$ in FIG. 4. This central station 10 is internally provided with an information processing device such as a workstation (WS), such that bi-directional information transmission is conducted between each of the respective optical amplifying devices $4_1$ through $4_n$ and the workstation. In this case, the central station 10 is provided with a function as the correction value calculating section 5B in the basic constitution of FIG. 1. Note, it is also possible to divide the optical amplifying devices $4_1$ through $4_n$ into several groups, and central stations are provided for such groups, respectively.

As the optical amplifying devices $4_1$ through $4_n$, it is preferable to apply a constitution thereto such as disclosed in the aforementioned OAA'98, WA2, pp.173–176 and OAA'98, MD1, pp.54–57. Example of specific constitution therefor is shown in a block diagram of FIG. 5. However, the constitution of the optical amplifying devices adopted in the present invention is not limited thereto.

Figure 5:
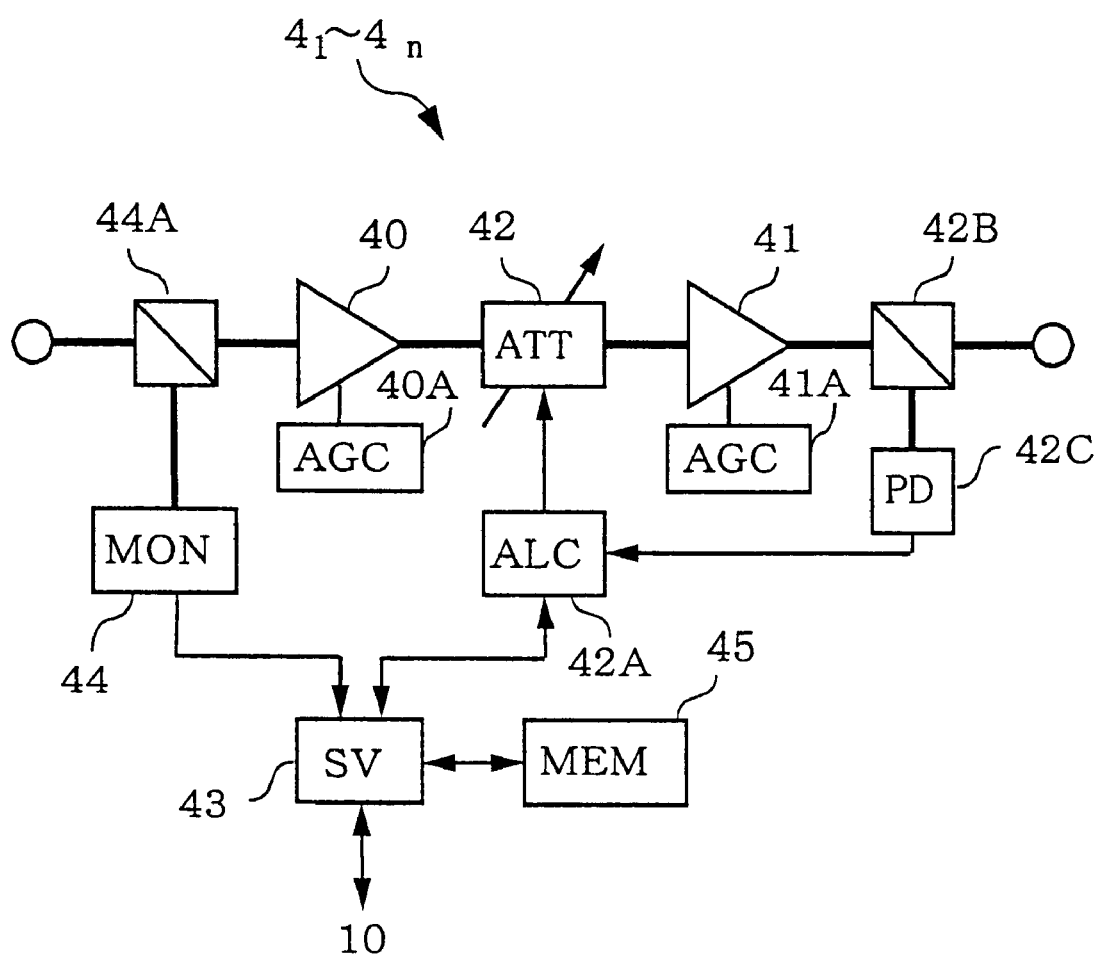
FIG. 5 is a block diagram showing an example of a concrete constitution of an optical amplifying device adopted in the embodiment (1-1)

The optical amplifying device shown in FIG. 5 is of a two stage constitution having a preceding stage optical amplifier 40 and a succeeding stage optical amplifier 41, and includes a variable optical attenuator (ATT) 42 therebetween. As the preceding stage optical amplifier 40 and succeeding stage optical amplifier 41, it is possible to adopt a known optical amplifier such as an optical fiber amplifier utilizing a rare-earth-element doped fiber. The operations of amplifiers 40 and 41 are controlled by AGC circuits 40A, 41A, respectively, such that the gains are fixed, respectively.

The variable optical attenuator 42 shall be a known optical attenuator capable of changing its optical attenuation amount based on a signal from the exterior. The optical attenuation amount of this variable optical attenuator 42 is controlled by a signal to be output from an ALC circuit 42A. Based on a signal obtained by branching the output light of the succeeding stage amplifier 41 by an optical coupler 42B and then photoelectrically converting the thus branched output light by a photodetector (PD) 42C, the ALC circuit 42A generates a signal for controlling the optical attenuation amount of the variable optical attenuator 42 such that the output light power of the succeeding stage amplifier 41 is kept constant at its output setting level. The output setting level to be treated as a reference at this time is controlled by a signal from a monitoring system (SV) 43 so as to reflect the output correction value calculated by the central station 10. Concretely, the ALC level is set to be a level of a sum of m×Po and the output correction value, assuming that output light power per one wavelength is Po, and the number of used wavelengths is m.

According to a signal sent from the central station 10, the monitoring system 43 sends, to the ALC circuit 42A, a signal for controlling the output setting level of the ALC, and also sends, to the central station 10, input light power measured by an input light monitor (MON) 44 and information stored in a memory (MEM) 45.

The input light monitor 44 measures the total input light power, by branching a part of input light into the preceding stage optical amplifier 40 via optical coupler 44A, and then monitoring the branched light. Previously stored in the memory 45 is an NF value corresponding to the input light power and a bandwidth, for the present optical amplifying device, itself. In case of monitoring the number of used wavelengths in the optical amplifying device, although not shown, there shall be separately provided such as a wavelength number monitor, and its monitoring result shall be sent to the central station via a monitoring system 43.

Here, the input light monitor 44 corresponds to the input light measuring section 5A in the basic constitution in FIG. 1, and the ALC circuit 42A has a function as a correction executing section.

In the WDM optical communication system having the aforementioned constitution, the information (total input light power $P_{Tin}$, noise figure NF, bandwidth $\Delta F$, and number m of used wavelengths) concerning the respective optical amplifying devices $4_1$ through $4_n$ is collected to the workstation of the central station 10. At the central station 10, correction ratios $\Delta_1$ through $\Delta_n$ for the respective optical amplifying devices $4_1$ through $4_n$ are calculated making use of the following equations (14a) and (14b) which can be similarly obtained in a manner by which the aforementioned equation (13) is obtained from the equation (9):

$$\Delta_k = \sum_{i=1}^{k} 10^{\frac{NF_i - 10\log\left(\frac{P_{Tin(i)}}{m}\right)}{10}} \times \frac{hv \cdot \Delta f}{m} \quad (14a)$$

$$\Delta_k = \sum_{i=1}^{k} 10^{\frac{NF_i - 10\log\left(\frac{P_{Tin(i)}}{m}\right) + 10\log(\delta k - 1 + 1)}{10}} \times \frac{hv \cdot \Delta f}{m} \quad (14b)$$

It is noted that, upon calculating a correction ratio, the equation (14a) is adopted when the output correction has not been performed yet, while the equation (14b) is adopted when the output correction has been performed.

For the respective optical amplifying devices $4_1$ through $4_n$, if the value of the total input light power $P_{Tin}$, the noise figure NF or the bandwidth $\Delta F$ have been substantially determined in advance, the respective values may be given to the respective equations as fixed values to thereby calculate the respective correction ratios $\Delta_1$ through $\Delta_n$. Further, the NF value corresponding to an input light power may be provided in advance within the memory 45 in a form of database relative to input light power for each types of optical amplifying devices, or may be calculated making use of a linear approximate equation represented by the following equation (15):

$$NF_k[\text{dB}] = a \times \{10 \log(P_{Tin(k)}/m) - 10 \log(1 + \delta_{k-1})\} + b \quad (15)$$

in which a and b are constants to be determined correspondingly to characteristics of an optical amplifying device. In this way, by obtaining an NF value corresponding to input light power making use of a linear approximate equation, the storage capacity of the memory 45 can be reduced.

The correction ratios $\Delta_1$ through $\Delta_n$ of the respective optical amplifying devices $4_1$ through $4_n$ as calculated above are sent from the central station 10 to the corresponding monitoring systems 43 of the optical amplifying devices $4_1$ through $4_n$, respectively. At the respective optical amplifying devices $4_1$ through $4_n$, the output setting levels of ALC are corrected corresponding to the correction ratios $\Delta_1$ through $\Delta_n$ from the central station 10.

There will be described hereinafter a method for concretely performing the output correction in the present WDM optical communication system, separately for a system start-up and an in-service condition.

In case of applying, at the time of system start-up, the aforementioned simultaneous output correction performing pattern as a performing pattern, there is used an execution procedure such as shown in a flowchart of FIG. 6.

At step 101 (indicated as "S101" in the figure, and the same rule is correspondingly applied hereinafter) of FIG. 6, each of optical amplifying devices $4_1$ through $4_n$ is operated under a condition that its output correction is not performed. At step 102, a total input light power $P_{Tin}$ is monitored at each of optical amplifying devices $4_1$ through $4_n$; and, when the number m of used wavelengths is to be detected at each of optical amplifying devices $4_1$ through $4_n$, the number m of wavelengths is also monitored. Then, there are transmitted the monitored total input light power $P_{Tin}$, a noise figure NF corresponding thereto, bandwidth $\Delta F$ and the number m of wavelengths, from each of the optical amplifying devices $4_1$ through $4_n$ to the central station 10. Note, data for noise figure NF and bandwidth $\Delta F$ may be prepared at the central station 10.

At step 103, there are serially calculated, at the central station 10, the correction ratios $\Delta_1$ through $\Delta_n$ in an order from the upstream side (transmitting side) optical amplifying device $4_1$, according to the equation (14a) (alternatively, the equation (12) may be used), based on the information from the respective optical amplifying devices $4_1$ through $4_n$. At this time, values of $\delta_1, \delta_2, \ldots \delta_{k-1}, \ldots \delta_{n-1}$ are all rendered to be zero. At step 104, the calculated correction ratios $\Delta_1$ through $\Delta_n$ are transmitted to the corresponding optical amplifying devices $4_1$ through $4_n$, respectively, and stored in the respective memories 45 thereof.

Upon completion of transmission of respective correction ratios $\Delta_1$ through $\Delta_n$, there are transmitted commands for signaling execution of output correction, from the central station 10 to the respective optical amplifying devices $4_1$ through $4_n$, at step 105. At step 106, there are executed corrections of output setting levels of ALC according to the correction ratios $\Delta_1$ through $\Delta_n$ stored in the memories 45, respectively, at respective optical amplifying devices $4_1$ through $4_n$. For example, output setting levels are increased by $10 \cdot \log(1 + \Delta_{1-n})$, respectively, when such a level is given at a dBm unit. According to a series of processings at steps 101 through 106, there is completed the simultaneous output correction performing pattern at the system start-up.

In case of applying the sequential output correction performing pattern at the time of system start-up, there is used an execution procedure such as shown in a flowchart of FIG. 7.

Firstly at step 201 in FIG. 7, each of optical amplifying devices $4_1$ through $4_n$ is operated under a condition that its output correction is not performed. Then, there are sequentially executed a series of processings at steps 202 through 207, in an order from the upstream optical amplifying device to the downstream one. The following is described for an optical amplifying device $4_i$ at an i-th stage.

At step 202, when total input light power $P_{Tin(i)}$ is monitored, and also the number m of used wavelengths is detected at the optical amplifying device $4_i$, the number m of wavelengths is also monitored. Then, there are transmitted the monitored total input light power $P_{Tin(i)}$, a noise figure $NF_i$ corresponding thereto, bandwidth $\Delta F$ and the number m of wavelengths, from the optical amplifying device $4_i$ to the central station 10.

At step 203, there is calculated, at the central station 10, the correction ratio $\Delta_i$ as $\delta_{i-1} = \Delta_{i-1}$, according to the equation (14a) (alternatively, the equation (12) may be used), based on the information from the optical amplifying device $4_i$. At step 204, the calculated correction ratio $\Delta_i$ is transmitted to the optical amplifying device $4_i$, and stored in the memory 45 thereof. There is transmitted a command for signaling execution of output correction, from the central station 10 to the optical amplifying device $4_i$, at step 205. At step 206, there is executed a correction of output setting level of ALC according to the correction ratio $\Delta_i$ stored in the memory 45 at the optical amplifying device $4_i$. For example, output setting level is increased by $10 \cdot \log(1 + \Delta_i)$, when such a level is given at a dBm unit.

Next, at step 207, it is judged whether output correction has been executed up to the optical amplifying device $4_n$ at the final stage. If it has not been executed up to the optical amplifying device $4_n$, the flow goes back to step 202 to thereby repeat the processing for an optical amplifying device of next stage. Upon completion of the execution of output correction up to the optical amplifying device $4_n$, there is completed the sequential output correction performing pattern at the time of system start-up.

In the above, the central station 10 is rendered to transmit the output correction execution command at step 205, after transmitting the correction ratio to the optical amplifying device at step 204. However, it is also possible to omit step 205, and to execute the output correction simultaneously with the notification of the correction ratio.

Meanwhile, in case of applying, under an in-service condition, the aforementioned simultaneous output correction performing pattern, there is used an execution procedure such as shown in a flowchart of FIG. 8.

At step 301 of FIG. 8, the respective optical amplifying devices $4_1$ through $4_n$ under in-service condition are operating according to the output correction ratios (these values are represented as $\delta_1$ through $\delta_n$) as already calculated. In case of occurrence of demand for reevaluation of output correction values in such a state, there are executed the processings at step 302 and so forth.

At step 302, there is monitored such as total input light power $P_{Tin}$ at each of optical amplifying devices $4_1$ through $4_n$, and there are transmitted total input light power $P_{Tin}$, noise figure NF, bandwidth ΔF and the number m of wavelengths from each of optical amplifying devices $4_1$ through $4_n$ to the central station 10.

At step 303, there are serially calculated, at the central station 10, the correction ratios $\Delta_1$ through $\Delta_n$ in an order from the upstream side (transmitting side) optical amplifying device $4_1$, according to the equation (14a) (alternatively, the equation (12) may be used), based on the information from the respective optical amplifying devices $4_1$ through $4_n$. At this time, as output correction ratios $\delta_1$ through $\delta_{n-1}$, there are adopted those values which have been stored in the memories 45 at the last setting time and which are currently set in the respective optical amplifying devices $4_1$ through $4_{n-1}$. At step 304, the newly calculated correction ratios $\Delta_1$ through $\Delta_n$ are transmitted to the corresponding optical amplifying devices $4_1$ through $4_n$, respectively, and the stored data of the respective memories 45 are updated.

Upon completion of transmission of respective correction ratios $\Delta_1$ through $\Delta_n$, there are transmitted commands for signaling execution of output correction, from the central station 10 to the respective optical amplifying devices $4_1$ through $4_n$, at step 305. At step 306, there are re-executed corrections of output setting levels of ALC according to the correction ratios $\Delta_1$ through $\Delta_n$ stored in the memories 45, respectively, at optical amplifying devices $4_1$ through $4_n$, to thereby resume ALC of the respective optical amplifying devices $4_1$ through $4_n$. According to such a series of processings, there is completed the simultaneous output correction performing pattern under an in-service condition.

In case of applying the aforementioned sequential output correction performing pattern under in-service condition, there is used an execution procedure such as shown in a flowchart of FIG. 9.

At step 401 of FIG. 9, each of optical amplifying devices $4_1$ through $4_n$ in an in-service condition is operating according to output correction ratios $\delta_1$ through $\delta_n$ as already calculated. Upon reevaluation request of the output correction values, there are sequentially executed a series of processings at steps 402 through 407, in an order from the upstream optical amplifying device toward the downstream one. The following is described for an optical amplifying device $4_i$ at an i-th stage.

At step 402, there are monitored such as total input light power $P_{Tin(i)}$. Then, there are transmitted the total input light power $P_{Tin(i)}$, a noise figure $NF_i$, bandwidth ΔF and the number m of wavelengths, from the optical amplifying device $4_i$ to the central station 10.

At step 403, there is calculated, at the central station 10, the correction ratio $\Delta_i$ according to the equation (14a) (alternatively, the equation (12) may be used) based on the information from the optical amplifying device $4_i$. At this time, as a value of $\delta_{i-1}$, there is adopted $\Delta_{i-1}$ which has been calculated just before. At step 404, the newly calculated correction ratio $\Delta_i$ is transmitted to the optical amplifying device $4_i$, and the stored data of the memory 45 is updated. There is transmitted a command for signaling execution of output correction, from the central station 10 to the optical amplifying device $4_i$, at step 405. At step 406, there is executed a recorrection of output setting level of ALC according to the correction ratio $\Delta_i$ stored in the memory 45 at the optical amplifying device $4_i$.

Next, at step 407, it is judged whether output correction has been executed up to the downstream side optical amplifying device $4_n$ (the final stage). If it has not been executed up to the optical amplifying device $4_n$, the flow goes back to step 402 to thereby repeat the processing for an optical amplifying device of next stage. Upon completion of the execution of output correction up to the optical amplifying device $4_n$, there is completed the sequential output correction performing pattern under an in-service condition. It is also possible here to omit step 405, and to execute the output correction simultaneously with the notification of the correction ratio.

According to the embodiment (1-1) as described above, by collectively calculating the output corrections of the respective optical amplifying devices $4_1$ through $4_n$ at the central station 10, the signal light power to be output from each of the optical amplifying devices is kept at a required constant value irrespectively of the number of used wavelengths, so that improvement of transmission characteristics of WDM signal light can be achieved.

There will be described hereinafter another embodiment (1-2) applied with the first basic constitution.

Figure 10:
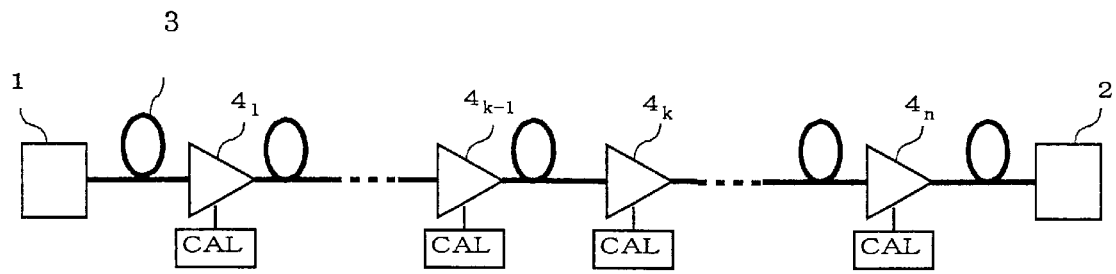
FIG. 10 is a block diagram showing a constitution of a WDM optical communication system of an embodiment (1-2)

FIG. 10 is a block diagram showing a constitution of a WDM optical communication system in the embodiment (1-2).

The WDM optical communication system according to this embodiment (1-2) is characterized in that the optical amplifying devices are capable of calculating their own output correction values, respectively, and that there is adopted such a method in which a correction value calculated at an optical amplifying device at a preceding stage is transferred to an optical amplifying device at a succeeding stage. Concretely, the plurality of optical amplifying devices $4_1$ through $4_n$ are provided with functions as the correction value calculating sections (CAL), respectively.

Figure 11:
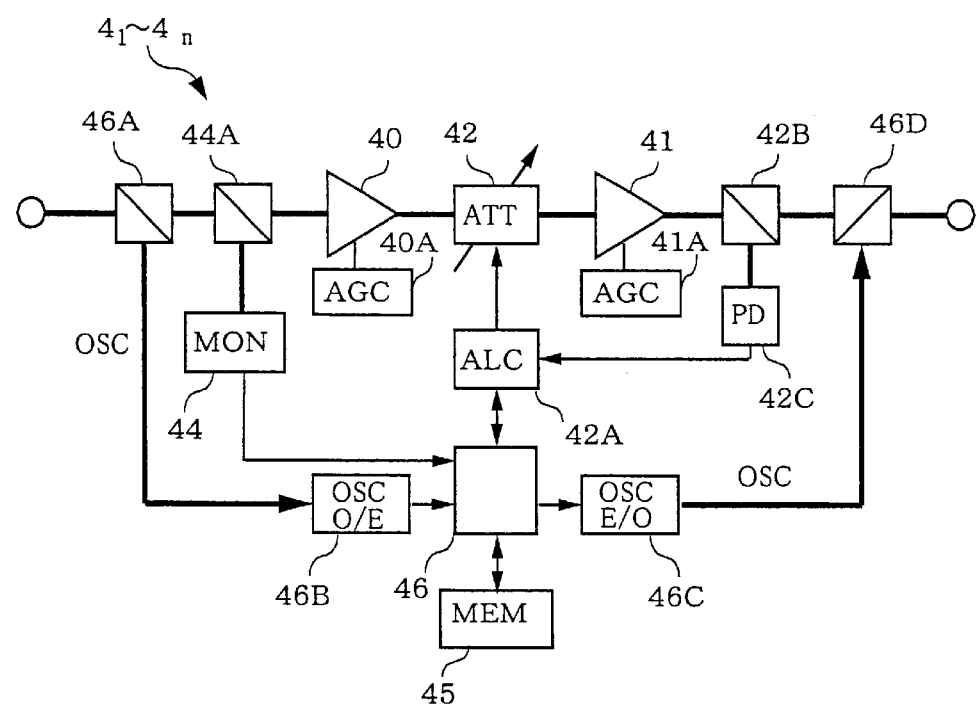
FIG. 11 is a block diagram showing an example of a specific constitution of an optical amplifying device adopted in the embodiment (1-2)

FIG. 11 is a block diagram showing an example of specific constitution of each of the optical amplifying devices $4_1$ through $4_n$.

Basically, the constitution of optical amplifying device of FIG. 11 is provided by adding those elements for calculating a correction value, to the aforementioned constitution of optical amplifying device of FIG. 5. Concretely, instead of the monitoring system 43 of FIG. 5, there are provided a WDM coupler 46A, an OSC-oriented optical receiver (OSC O/E) 46B, a signal processing circuit 46, an OSC-oriented optical transmitter (OSC E/O) 46C, and a WDM coupler 46E. It is supposed here that a monitoring control (OSC) signal is utilized to transfer such as a correction value calculated at a preceding stage and the number of wavelengths. This monitoring control signal is an optical signal which has a wavelength different from that of a main signal wavelength of WDM signal light to be repeated and transmitted, and is wavelength division multiplexed together with main signal light to be transmitted among the respective optical amplifying devices $4_1$ through $4_n$.

The WDM coupler 46A is an optical device for extracting a monitoring control signal component from WDM light input into the optical amplifying device through the optical fiber transmission path 3, and is arranged at a preceding stage of the optical coupler 44A. The OSC-oriented optical receiver 46B receives the optical signal extracted at the WDM coupler 46A, and reproduces the monitoring control signal to thereby output the same to the signal processing circuit 46. The signal processing circuit 46 calculates a correction ratio according to the equation (12), by utilizing a monitoring control signal from the OSC-oriented optical receiver 46B, the total input light power from the input light monitor 44, and the noise figure and bandwidth stored in the memory 45. Thereafter, the circuit 46 sends a signal for correcting an output setting level of ALC, to the ALC circuit 42A. The calculated correction ratio is stored into the memory 45, and also sent, as a monitoring control signal, to an optical amplifying device at a succeeding stage, to the OSC-oriented optical transmitter 46C. The OSC-oriented optical transmitter 46C converts the monitoring control signal from the signal processing circuit 46 into an optical signal, and outputs the same to the WDM coupler 46E. This WDM coupler 46E is an optical device for multiplexing the output light from the OSC-oriented optical transmitter 46C into the main signal light, and is arranged at a succeeding stage of the optical coupler 44A in this situation.

There will be hereinafter described a method for concretely performing the output correction in the present WDM optical communication system, separately for a system start-up and an in-service condition.

Figure 12:
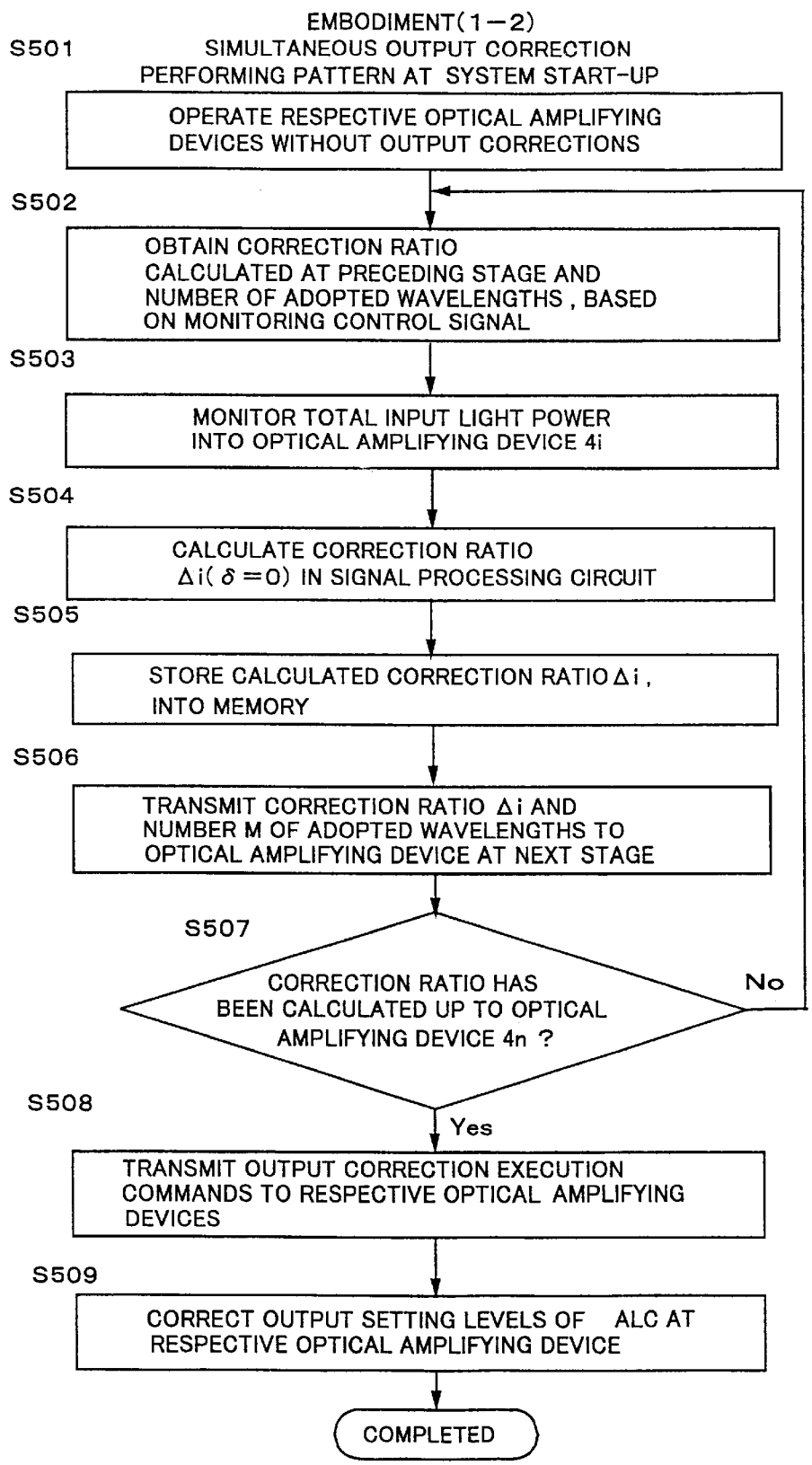
FIG. 12 is a flowchart showing a correction performing method when a simultaneous output correction performing pattern is applied at the time of system start-up, for the embodiment (1-2)

In case of applying, at the time of system start-up, there is adopted an execution procedure such as shown in flowchart of FIG. 12.

Firstly at step 501 in FIG. 12, each of optical amplifying devices $4_1$ through $4_n$ is operated under a condition that its output correction is not performed. Then, there are sequentially executed a series of processings at steps 502 through 507, in an order from the upstream optical amplifying device toward the downstream one. The following is described for an optical amplifying device $4_i$ at an i-th stage.

At step 502, by receiving a monitoring control signal sent from an optical amplifying device $4_{i-1}$ at a preceding stage, there are obtained the number m of used wavelengths and a correction ratio $\Delta_{i-1}$ as calculated at a preceding stage. Note, in case of an optical amplifying device at a first stage (i=1), there is obtained only a number m of used wavelengths. Then, at step 503, there is monitored such as total input light power $P_{Tin(i)}$ into the optical amplifying device $4_i$.

At step 504, there is calculated a correction ratio $\Delta_i$ as $\delta_{i-1}=0$, according to the equation (12), making use of the data obtained at steps 502 and 503 and corresponding noise figure $NF_i$ and bandwidth $\Delta F$ stored in the memory 45. At step 505, the calculated correction ratio $\Delta_i$ is stored into the memory 45. At step 506, the information of the correction ratio $\Delta_i$ and the number m of used wavelengths at the optical amplifying device $4_i$ is transmitted, as a monitoring control signal, to an optical amplifying device $4_{i+1}$ at a next stage.

Next, at step 507, it is judged whether or not calculation of correction ratio has been finished up to the optical amplifying device $4_n$ at the final stage. If it has not been finished up to the optical amplifying device $4_n$, the flow goes back to step 502 to thereby repeat the processing for an optical amplifying device of next stage. Upon completion up to the optical amplifying device $4_n$, the flow goes to next step 508.

At step 508, there are transmitted commands for signaling execution of output correction, to the respective optical amplifying devices $4_1$ through $4_n$. These commands shall be set to be instantaneously notified to the respective optical amplifying devices $4_1$ through $4_n$ such as via monitoring control signal. At step 509, there are executed corrections of output setting levels of ALC according to the correction ratios $\Delta_1$ through $\Delta_n$ stored in the memories 45, respectively, at optical amplifying devices $4_1$ through $4_n$. At this time, output setting levels are increased by $10 \log(1+\Delta_{1-n})$, respectively, when such a level is given at a dBm unit. In this way, there is completed the simultaneous output correction performing pattern at the system start-up.

In case of applying the sequential output correction performing pattern at the time of system start-up, there is used an execution procedure such as shown in a flowchart of FIG. 13.

In FIG. 13, processings at steps 601 to 603 are identical with those at steps 501 to 503 where the simultaneous output correction performing pattern is applied.

At next step 604, there is calculated a correction ratio $\Delta_i$, according to the equation (12), making use of the data obtained at steps 602 and 603 and corresponding noise figure $NF_i$ and bandwidth $\Delta F$ stored in the memory 45. At this time, the calculation is performed supposing that $\delta_{i-1}=\Delta_{i-1}$. At step 605, the calculated correction ratio $\Delta_i$ is stored into the memory 45, and there is performed a correction of output setting level of ALC according to this correction ratio $\Delta_i$. Further, at step 606, the information of the correction ratio $\Delta_i$ and the number m of used wavelengths stored in the memory is transmitted, as a monitoring control signal, to an optical amplifying device $4_{i+1}$ at a next stage.

Next, at step 607, it is judged whether or not calculation of correction ratio and execution of output correction have been finished up to the optical amplifying device $4_n$ at the final stage. If they have not been finished up to the optical amplifying device $4_n$, the flow goes back to step 602 to thereby repeat the processing for an optical amplifying device of next stage. Upon finishing up to the optical amplifying device $4_n$, there is completed the sequential output correction performing pattern at system start-up.

Meanwhile, execution procedure under an in-service condition is different from the aforementioned execution procedure at the system start-up: in that the optical amplifying devices $4_1$ through $4_n$ at first step 501 or 601 operate in accordance with the previously calculated output correction ratios $\delta_1$ through $\delta_n$, respectively; and in that, in case of applying a simultaneous output correction performing pattern, the value to be used as $\delta_{i-1}$ in calculating the correction ratio $\Delta_i$ at the aforementioned step 504, is provided: by receiving that correction ratio which has been stored in the memory 45 of an optical amplifying device $4_{i-1}$ at a preceding stage at the time of the previous setting, or by using the correction ratio of the preceding stage which has been received by the optical amplifying device $4_i$ itself and stored into its memory 45 at the time of the previous setting. Explanation of execution procedures under an in-service condition other than the above is omitted here, since such procedures are identical with those at the system start-up.

According to the embodiment (1-2) as described above, there can be obtained an effect identical with the embodiment (1-1), by calculating the output correction values at optical amplifying devices $4_1$ through $4_n$, respectively.

There will be described hereinafter yet another embodiment (1-3) applied with the first basic constitution.

The WDM optical communication system of the embodiment (1-3) is characterized in that the method for calculating an output correction value is improved so that the output correction value can be promptly settled corresponding to change in the number of used wavelengths under an in-service condition, such as for the embodiment (1-2). Since the system constitution itself is identical with that of the embodiment (1-2) shown in FIG. 10, its explanation is omitted.

The embodiment (1-3) is constituted such that correction values up to the maximum number $m_{max}$ of wavelengths to be used in the system are calculated in advance at each of the optical amplifying devices $4_1$ through $4_n$ and stored in the memory 45 of each of the optical amplifying devices $4_1$ through $4_n$, and a corresponding correction value for the number of wavelengths is reflected to an output setting level when the number of used wavelengths is changed under an in-service condition. The reason, why it is possible to calculate the correction values up to the maximum number $m_{max}$ of wavelengths at each of the optical amplifying devices $4_1$ through $4_n$, is that the value of $\{NF_k - 10 \cdot \log(P_{Tin(k)}/m) + 10 \cdot \log(1+\delta_{k-1})\}$ of the aforementioned equation (12) becomes constant irrespectively of the number of used wavelengths. Thus, if such a value at a certain number of wavelengths is obtained once, it becomes possible to calculate correction ratios $\Delta_k$ corresponding to the number of wavelengths, respectively, by sequentially assigning from 1 (one) to the maximum number $m_{max}$ of wavelengths as the number m of wavelengths in the equation (12) while treating the once obtained value as a constant.

There will be now described a basic method for calculating a correction ratio such as at an optical amplifying device $4_i$ at an i-th stage, with reference to a flowchart of FIG. 14.

At step 701 in FIG. 14, such as by a monitoring control signal, transmitted from an optical amplifying device $4_{i-1}$ at a preceding stage, to an optical amplifying device $4_i$ at the i-th stage, are: correction ratios $\Delta_{i-1}(m)$ corresponding to the number m of wavelengths ($=1$ to $m_{max}$) up to the maximum number $m_{max}$ of wavelengths, which are calculated by the optical amplifying device $4_i$ at the preceding stage; the currently operating number $m_o$ of wavelengths; and the currently executed correction ratio $\delta_{i-1}(m_o)$ at the optical amplifying device $4_{i-1}$. Note, $\delta_{i-1}(m_o)=\Delta_{i-1}(m_o)$, when the optical amplifying device $4_{i-1}$ at the preceding stage is executing the output correction in accordance with a newly calculated correction ratio $\Delta_{i-1}(m_o)$. In such a situation, it is possible to reduce the amount of transfer information between optical amplifying devices.

At step 702, the optical amplifying device $4_i$ receives the monitoring control signal from the preceding stage to thereby obtain the aforementioned each information at the optical amplifying device $4_{i-1}$, and there is monitored the total input light power $P_{Tin(i)}$ into the optical amplifying device $4_i$. At step 703, there are calculated not only the correction ratio $\Delta_i(m_o)$ at the current number $m_o$ of wavelengths but also correction ratios $\Delta_i(1)$ to $\Delta_i(m_{max})$ corresponding to the number m of wavelengths up to the maximum number $m_{max}$ of wavelengths, in accordance with the aforementioned equation (12), making use of the total input light power $P_{Tin(i)}$, the noise figure $NF_i$ corresponding thereto, the bandwidth $\Delta F$, and each information obtained from the optical amplifying device $4_{i-1}$ at the preceding stage. At step 704, the values of calculated correction ratios $\Delta_i(1)$ to $\Delta_i(m_{max})$ are stored into the memory 45 of optical amplifying device $4_i$.

At step 705, to an optical amplifying device $4_{i+}$. at a next stage, there are transmitted correction ratios $\Delta_i(m)$ corresponding to the number m of wavelengths ($=1$ to $m_{max}$) up to the maximum number $m_{max}$ of wavelengths at the optical amplifying device $4_i$; the currently operating number $m_o$ of wavelengths; and the currently executed correction ratio $\delta_i(m_o)$. Also in this case, $\delta_i(m_o)=\Delta_i(m_o)$, when the correction of an output setting level is being executed in accordance with a newly calculated correction ratio $\Delta_i(m_o)$ before transmitting to the next stage.

By sequentially executing the series of processings at steps 701 through 705 from an optical amplifying device at an upstream side, each of the memories 45 of optical amplifying devices $4_1$ through $4_n$ turns to store therein correction ratios corresponding to the numbers of wavelengths from 1 (one) to the maximum number $m_{max}$ of wavelengths. In this way, upon occurrence of change in the number of used wavelengths under an in-service condition, each of the optical amplifying devices $4_1$ through $4_n$ reads out from its memory 45 a correction ratio corresponding to the number of wavelengths after change, and changes the output correction value in accordance with the thus read out correction ratio, to thereby enable prompt execution of output correction.

In the above method, the data amount to be transferred is increased as the maximum number $m_{max}$ of wavelengths is increased, since a plurality of correction ratios corresponding to the numbers of wavelengths up to the maximum number $m_{max}$ of wavelengths are transferred among the optical amplifying devices $4_1$ through $4_n$. In such a situation, it is possible to reduce the data amount to be transferred, as follows.

The aforementioned equation (12) can be rewritten as follows, by assuming $m \times \Delta_k = d_k$:

$$d_k = d_{k-1} + hv \cdot \Delta f \cdot 10^{\frac{NF_k - 10\log(P_{Tin(k)}/mo) + 10\log(1+\delta k-1)}{10}} \quad (16)$$

$$= d_{k-1} + c_k$$

$$d_o = c_o = 0,$$

$$d_1 = d_o + c_1 = c_1$$

The second term of equation (16) is determined by total input light power and a noise figure, thus this second term is independent of the number of wavelengths. As such, values of $d_k$ and $c_k$ are also independent of the number of wavelengths. Thus, correction ratio at the number m of wavelengths can be given by the following equation (17), making use of $d_k$:

$$\Delta_k(m) = d_k/m \quad (17).$$

Based on the relationship of the equation (17), the respective optical amplifying devices may transfer the values of $d_k$ corresponding to the current numbers $m_o$ of wavelengths among the optical amplifying devices. Further, each of the optical amplifying devices may calculate the correction ratios $\Delta_k(1)$ to $\Delta_k(m_{max})$ corresponding to the respective numbers of wavelengths, by dividing the obtained value $d_k$ sequentially by the respective number of wavelengths up to the maximum number $m_{max}$ of wavelengths, respectively, and may store the calculated correction ratios into its own memory 45.

For example, between the optical amplifying device $4_{k-1}$ and optical amplifying device $4_k$, it is possible for the optical amplifying device $4_k$ to calculate the correction ratios corresponding to the respective numbers of wavelengths, by transferring thereto. the current number $m_o$ of used wavelengths; the amount $d_{k-1}$ for the output correction value, and the correction ratio $\delta_{k-1}$ currently executed at the optical amplifying device $4_{k-1}$. Further, when there has been already executed an output correction according to a correction ratio newly calculated at the optical amplifying device $4_{k-1}$, i.e., when $\delta_{k-1}=\Delta_{k-1}$, $\delta_{k-1}$ can be given as $\delta_{k-1}=d_{k-1}/m_o$, so that it is enough to transfer only the current number $m_o$ of used wavelengths and $d_{k-1}$ to the optical amplifying device $4_k$.

In this way, by using the amount $d_{k-1}$ for an output correction value, it becomes possible to remarkably reduce the data amount to be transferred among the optical amplifying devices.

There will be hereinafter described a method for concretely performing the output correction to achieve the simplification of data to be transferred, separately for situations where a simultaneous output correction performing pattern and a sequential output correction performing pattern are applied, respectively.

FIG. 15 is a flowchart where a simultaneous output correction performing pattern is applied.

Firstly at step 801 of FIG. 15, each of optical amplifying devices $4_1$ through $4_n$ is operated under a condition that its output correction is not performed before entering an in-service condition, such as at a system start-up. Then, there are sequentially executed a series of processings at steps 802 through 808, in an order from the upstream optical amplifying device toward the downstream one. The following is described for an optical amplifying device $4_i$ at an i-th stage.

At step 802, the optical amplifying device $4_i$ receives a monitoring control signal from the optical amplifying device $4_{i-1}$ at the preceding stage, to thereby obtain the current number $m_o$ of used wavelengths, and the amount $d_{i-1}$ for the output correction value of the optical amplifying device $4_i$. Further, at step 803, total input light power $P_{Tin(i)}$ to the optical amplifying device $4_i$ is monitored.

At step 804, there is calculated the amount $d_i$ for the output correction value of the optical amplifying device $4_i$, in accordance with the equation (16), making use of: the noise figure $NF_i$ corresponding to the monitored total input light power $P_{Tin(i)}$; the bandwidth $\Delta F$; the number $m_o$ of wavelengths; and the amount $d_{i-1}$ for the output correction value of the optical amplifying device $4_{i-1}$. At this time, value of $\delta_{i-1}$ is set to be zero. Next at step 805, making use of the calculated $d_i$, there are calculated the correction ratios $\Delta_i(m)$ corresponding to the respective number m of wavelengths (=1 to $m_{max}$) up to the maximum number $m_{max}$ of wavelengths, respectively, in accordance with the relationship of the equation (17). At step 806, the respective correction ratios $\Delta_i(m)$ are stored into the memory 45 of optical amplifying device $4_i$. At step 807, the amount $d_i$ for the output correction value of the optical amplifying device $4_i$ and the current number $m_o$ of wavelengths are transmitted to the optical amplifying device $4_{i-1}$ at a next stage.

Next, at step 808, it is judged whether or not calculation of correction ratio has been finished up to the optical amplifying device $4_n$ at the final stage. If it has not been finished up to the optical amplifying device $4_n$, the flow goes back to step 802 to thereby repeat the processing for an optical amplifying device of next stage. Upon completion up to the optical amplifying device $4_n$, the flow goes to next step 809.

At step 809, there are transmitted commands for signaling execution of output correction, to the respective optical amplifying devices $4_1$ through $4_n$. At step 810, there are executed corrections of output setting levels of ALC according to the correction ratios $\Delta_1(m_o)$ through $\Delta_n(m_o)$ corresponding to the current number $m_o$ of wavelengths, among those correction ratios stored in the memories 45, respectively, at respective optical amplifying devices $4_1$ through $4_n$.

Further, upon occurrence of change in the number of used wavelengths after entering an in-service condition, at step 811, correction ratio corresponding to the number of wavelengths after change is read out at each of the optical amplifying devices $4_1$ through $4_n$, and setting change of the read-out correction ratio is performed so that the flow goes back to step 809 to perform such as transmission of an output correction execution command.

FIG. 16 is a flowchart where a sequential output correction performing pattern is applied.

In FIG. 16, those processings at steps 901 through 903 are identical with those at steps 801 through 803 where the aforementioned simultaneous output correction performing pattern is applied. At next step 904, there is calculated the amount $d_i$ for the output correction value of the optical amplifying device $4_{i-1}$ in accordance with the equation (16) similarly to the step 804, as $\delta_{i-1}=d_{i-1}/m_o=\Delta_{i-1}(m_o)$. At step 905, making use of the calculated $d_i$, there are calculated the correction ratios $\Delta_i(m)$ corresponding to the respective number m of wavelengths (=1 to $m_{max}$) up to the maximum number $m_{max}$ of wavelengths, respectively, in accordance with the relationship of the equation (17). At step 906, the respective correction ratios $\Delta_i(m)$ are stored into the memory 45 of optical amplifying device $4_i$.

At step 907, there is performed a correction of an output setting level of the optical amplifying device $4_i$ in accordance with the correction ratio $\Delta_i(m_o)$ corresponding to the current number $m_o$ of wavelengths. Further, at step 908, the amount $d_i$ for the output correction value of the optical amplifying device $4_i$ and the current number $m_o$ of wavelengths are transmitted to the optical amplifying device $4_{i-1}$ at a next stage.

At step 909, it is judged whether or not execution of output correction has been finished up to the optical amplifying device $4_n$ at the final stage. If it has not been finished up to the optical amplifying device $4_n$, the flow goes back to step 902 to thereby repeat the processing for an optical amplifying device of next stage. Upon completion up to the optical amplifying device $4_n$, the condition transfers into an in-service condition.

Further, upon occurrence of change in the number of used wavelengths at step 910, correction ratio corresponding to the number of wavelengths after change is read out at each of the optical amplifying devices $4_1$ through $4_n$, and re-correction of an output setting level is performed in accordance with the correction ratio, sequentially at each of the optical amplifying devices.

In each of the aforementioned performing methods, there have been settled correction ratios corresponding to the number of wavelengths from 1 (one) up to the maximum number $m_{max}$ for each of the optical amplifying devices $4_1$ through $4_n$, before entering an in-service condition. Nonetheless, it is possible to perform such a processing even after entering an in-service condition. This situation is different from the above: in that the optical amplifying devices $4_1$ through $4_n$ at step 801 or step 901 operate in accordance with the previously calculated output correction ratios $\delta_1$ through $\delta_n$, respectively; and in that, in case of applying a simultaneous output correction performing pattern, the value to be used as $\delta_{i-1}$ in calculating $d_i$ at step 804, is provided: by receiving the old $d_{i-1}$ which has been stored in the memory 45 of an optical amplifying device $4_{i-1}$ at a preceding stage at the time of the previous setting, or by using the old $d_{i-1}$ of the preceding stage which has been received by the optical amplifying device $4_i$ itself and stored into its memory 45 at the time of the previous setting, such that $\delta_{i1}$=old $d_{i-1}/m_o$. Explanation of execution procedures under an in-service condition other than the above is omitted here, since such procedures are identical with those at the system start-up.

According to the embodiment (1-3) as described above, it becomes possible to promptly perform an output correction relative to change in the number of wavelengths under an in-service condition. Further, by applying the amount d for the output correction value which is represented by the equation (16), it becomes possible to achieve reducing a data amount to be transmitted between the optical amplifying devices.

There will be described hereinafter still another embodiment (14) applied with the first basic constitution.

The WDM optical communication system of the embodiment (1-4) is characterized in that, for such a system therein characteristics such as for noise figures and bandwidths of the plurality of optical amplifying devices $4_1$ through $4_n$ are substantially unified and light power to be input into the optical amplifying devices $4_1$ through $4_n$ do not change largely, the output correction values are prepared in memories of optical amplifying devices $4_1$ through $4_n$, respectively, in a form of two-dimension table. The constitution itself is identical with that of the embodiment (1-1) shown in FIG. 1, or the embodiment (1-2) shown in FIG. 10.

In the embodiment (14), there are realized a plurality of optical amplifying devices $4_1$ through $4_n$ having relatively unified characteristics, such as by adopting same types of optical amplifying devices. Under a system condition where such optical amplifying devices $4_1$ through $4_n$ are adopted and the input light power to optical amplifying devices $4_1$ through $4_n$ will not change largely, it becomes possible to provide output correction values in the respective optical amplifying devices $4_1$ through $4_n$ in a form of two-dimension table based on the number of repeating steps of optical amplifying devices and the number of wavelengths. Thus, by previously storing the aforementioned two-dimension tables of output correction values into memories 45 of optical amplifying devices $4_1$ through $4_n$, respectively, and then by notifying, such as via monitoring system, the optical amplifying devices $4_1$ through $4_n$ of as to what stage or order the applicable optical amplifying device is arranged at, and of the number of used wavelengths; the optical amplifying devices $4_1$ through $4_n$ are permitted to read out the data corresponding the notified information, from the correction value tables stored in memories 45 to thereby settle output correction values, respectively.

The correction value table can be obtained from the aforementioned equation (12). Here, the following Table 1 is a correction value table which can be obtained such as by assuming that input light power per one wavelength into each of optical amplifying devices $4_1$ through $4_n$ is 25 dBm, a noise figure of each of optical amplifying devices is then 7 dB, and a bandwidth is 30 nm.

TABLE 1

| Number of Wavelengths | Reapeated Number of Optical Amp | | | | | | | |
|---|---|---|---|---|---|---|---|---|
| | 1 | 2 | 3 | 4 | 5 | 6 | 7 | 8 |
| 1 | 2.5 | 4.0 | 5.2 | 6.1 | 6.8 | 7.5 | 8.0 | 8.5 |
| 2 | 1.4 | 2.5 | 3.3 | 4.0 | 4.6 | 5.2 | 5.6 | 6.1 |
| 3 | 1.0 | 1.8 | 2.5 | 3.0 | 3.6 | 4.0 | 4.4 | 4.8 |
| 4 | 0.8 | 1.4 | 2.0 | 2.5 | 2.9 | 3.3 | 3.7 | 4.0 |
| 5 | 0.6 | 1.2 | 1.6 | 2.1 | 2.5 | 2.8 | 3.2 | 3.5 |
| 6 | 0.5 | 1.0 | 1.4 | 1.8 | 2.1 | 2.5 | 2.8 | 3.0 |
| 7 | 0.4 | 0.9 | 1.2 | 1.6 | 1.9 | 2.2 | 2.5 | 2.7 |
| 8 | 0.4 | 0.8 | 1.1 | 1.4 | 1.7 | 2.0 | 2.2 | 2.5 |
| 9 | 0.4 | 0.7 | 1.0 | 1.3 | 1.5 | 1.8 | 2.0 | 2.2 |
| 10 | 0.3 | 0.6 | 0.9 | 1.2 | 1.4 | 1.6 | 1.9 | 2.1 |
| 11 | 0.3 | 0.6 | 0.8 | 1.1 | 1.3 | 1.5 | 1.7 | 1.9 |
| 12 | 0.3 | 0.5 | 0.8 | 1.0 | 1.2 | 1.4 | 1.6 | 1.8 |
| 13 | 0.2 | 0.5 | 0.7 | 0.9 | 1.1 | 1.3 | 1.5 | 1.7 |
| 14 | 0.2 | 0.4 | 0.7 | 0.9 | 1.0 | 1.2 | 1.4 | 1.6 |
| 15 | 0.2 | 0.4 | 0.6 | 0.8 | 1.0 | 1.2 | 1.3 | 1.5 |
| 16 | 0.2 | 0.4 | 0.6 | 0.8 | 0.9 | 1.1 | 1.2 | 1.4 |
| 17 | 0.2 | 0.4 | 0.5 | 0.7 | 0.9 | 1.0 | 1.2 | 1.3 |
| 18 | 0.2 | 0.4 | 0.5 | 0.7 | 0.8 | 1.0 | 1.1 | 1.3 |
| 19 | 0.2 | 0.3 | 0.5 | 0.6 | 0.8 | 0.9 | 1.1 | 1.2 |
| 20 | 0.2 | 0.3 | 0.5 | 0.6 | 0.8 | 0.9 | 1.0 | 1.2 |
| 21 | 0.2 | 0.3 | 0.4 | 0.6 | 0.7 | 0.9 | 1.0 | 1.1 |
| 22 | 0.1 | 0.3 | 0.4 | 0.6 | 0.7 | 0.8 | 0.9 | 1.1 |
| 23 | 0.1 | 0.3 | 0.4 | 0.5 | 0.7 | 0.8 | 0.9 | 1.0 |
| 24 | 0.1 | 0.3 | 0.4 | 0.5 | 0.6 | 0.8 | 0.9 | 1.0 |
| 25 | 0.1 | 0.3 | 0.4 | 0.5 | 0.6 | 0.7 | 0.8 | 0.9 |
| 26 | 0.1 | 0.2 | 0.4 | 0.5 | 0.6 | 0.7 | 0.8 | 0.9 |
| 27 | 0.1 | 0.2 | 0.4 | 0.5 | 0.6 | 0.7 | 0.8 | 0.9 |
| 28 | 0.1 | 0.2 | 0.3 | 0.4 | 0.6 | 0.7 | 0.8 | 0.9 |
| 29 | 0.1 | 0.2 | 0.3 | 0.4 | 0.5 | 0.6 | 0.7 | 0.8 |
| 30 | 0.1 | 0.2 | 0.3 | 0.4 | 0.5 | 0.6 | 0.7 | 0.8 |
| 31 | 0.1 | 0.2 | 0.3 | 0.4 | 0.5 | 0.6 | 0.7 | 0.8 |
| 32 | 0.1 | 0.2 | 0.3 | 0.4 | 0.5 | 0.6 | 0.7 | 0.8 |

Each of numerical values listed in Table 1 represents an output correction value per one wavelength represented at a dB unit. For example, when the applicable optical amplifying device is an optical amplifying device $4_2$ installed at a second stage and is operating with 2 (two) waves, output correction value is read out to be 2.5 dB. Thus, such as when a reference value is 0 dBm/ch, the output setting level of the optical amplifying device $4_2$ is set at 2.5 dBm/ch, by correcting the reference value by 2.5 dB.

According to the embodiment (14) as described above, it is possible to use optical amplifying devices having unified characteristics; and in a system where change in input light power is small, it is possible to prepare in advance output correction values for each of optical amplifying devices $4_1$ through $4_n$ in a form of two-dimension table. Thus, it becomes unnecessary to individually calculate output correction values for a plurality of optical amplifying devices, thereby permitting a more simplified constitution of WDM optical communication system.

There will be described hereinafter a second basic constitution of a WDM optical communication system according to the present invention.

In the WDM optical communication system having the second basic constitution, at each of a plurality of optical amplifying devices, there is actually monitored: signal light power included in output light; or ASE light power included in an optical signal to be obtained from optical amplifying device. Further, based on the monitored value, there is executed a correction of an output setting level of ALC.

Figure 17:
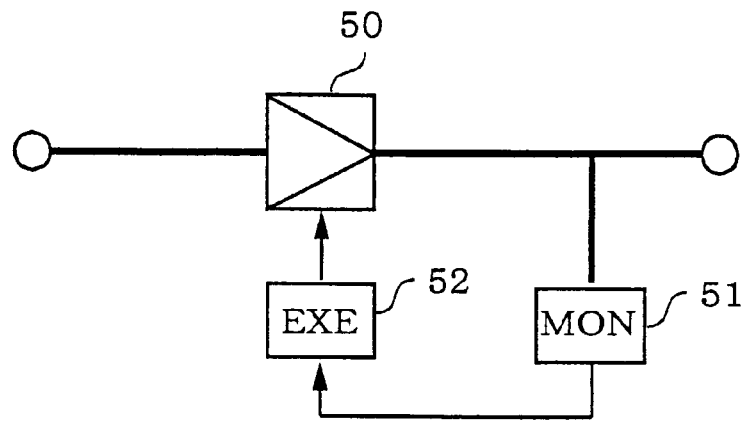
FIG. 17 is a block diagram showing an example of constitution of an optical amplifying device to be applied to a WDM optical communication system having a second basic constitution according to the present invention.

FIG. 17 is a block diagram showing an exemplary constitution of an optical amplifying device which is applied to the WDM optical communication system of the second basic constitution. The constitution of this optical amplifying device is applied to each of the optical amplifying devices of the WDM optical communication system shown in FIG. 21.

The basic constitution of optical amplifying device shown in FIG. 17 includes an optical amplifying section 50, an optical measuring section 51 and a correction executing section 52. The optical amplifying section 50 may be a known optical amplifier such as an optical fiber amplifier utilizing a rare earth element doped fiber. The optical measuring section 51 may be one of various constitutions to be described later, which is capable of measuring a power of signal light or ASE light included in branched light obtained by branching output light of the optical amplifying section 50. The correction executing section 52 performs a correction of an output setting level at the optical amplifying section 50, based on a measuring result of the optical measuring section 51.

There will be described hereinafter a specific embodiment of the WDM optical communication system having such a second basic constitution.

Figure 18:
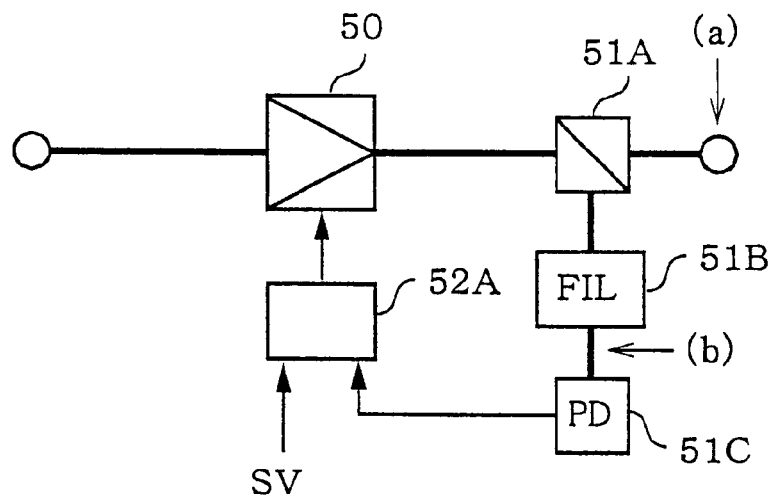
FIG. 18 is a block diagram showing an example of a specific constitution of an optical amplifying device adopted in an embodiment (2-1)

FIG. 18 is a block diagram showing an exemplary constitution of an optical amplifying device in an embodiment (2-1) applied with the second basic constitution.

The optical amplifying device in FIG. 18 includes an optical amplifying section 50, an optical branching section 51A, an optical filter (FIL) 51B, a photodetector (PD) 51C, and a signal processing section 52A. Here, the optical branching section 51A is a general optical device which is inserted at a latter stage of the optical amplifying section 50 so as to branch a section of output light from the optical amplifying section 50 and send the branched light to the optical filter 51B. The inserting position of the optical branching section 51A is not limited to the latter stage of the optical amplifying section 50, and may be at a stage before an output end of the optical amplifying section 50. This is possible because of a fact that ASE light caused at the optical amplifying section 50 is propagated in any direction other than the output end direction.

The optical filter 51B has a transmission band within a band of the optical amplifying section 50 except for a wavelength band of the signal light, and is capable of extracting only an ASE light component within such a transmission band. Concretely, it is possible to adopt an optical filter having a transmission band a central wavelength of which is between the signal light wavelengths or outside the signal light wavelengths. FIG. 19 schematically shows such a transmission characteristic a central wavelength of which is positioned between signal light wavelengths.

The photodetector 51C converts ASE light extracted at the optical filter 51B into an electrical signal, and outputs it as a monitored value $P_{omon}$ toward the signal processing section 52A.

The signal processing section 52A obtains ASE light power $P_{ASE}$ in accordance with the following equation (18), making use of the monitored value $P_{omon}$ from the photodetector 51C, and a previously stored transmission bandwidth $\Delta f_{FIL}$ of optical filter 51B and a previously stored bandwidth $\Delta F$ of optical amplifying section 50:

$$P_{ASE}=K\cdot \Delta f/\Delta f_{FIL} \qquad (18);$$

wherein K is a proportional constant. Further, the signal processing section 52A generates a signal for setting that an output setting level of ALC at the optical amplifying section 50 becomes a sum of an output reference value and the aforementioned ASE light power $P_{ASE}$, and outputs this signal to the optical amplifying section 50. Here, the output reference value is a value $m \times P_{outsig1}$ which is given by using a set value $P_{outsig1}$ of signal light output power per one wavelength and the number m of used wavelengths, and is transmitted to the signal processing section 52A such as via monitoring system (SV).

In such a WDM optical communication system of the embodiment (2-1), there is actually measured ASE light power $P_{ASE}$ at each of the plurality of optical amplifying devices, and the output setting level of the optical amplifying section 50 is set to be $m \times P_{outsig1}+P_{ASE}$. Thus, the signal light power to be output from each of the optical amplifying devices is kept at a required constant value irrespectively of the number of used wavelengths, thereby enabling improvement of transmission characteristics of WDM signal light.

There will be described another embodiment (2-2) of a WDM optical communication system having the second basic constitution.

FIG. 20 is a block diagram showing an exemplary constitution of an optical amplifying device in the embodiment (2-2).

The optical amplifying device of embodiment (2-2) is constituted such that an optical spectrum analyzer is adopted as the optical measuring section 51 so as to measure signal light power per one wavelength included in output light of the optical amplifying device and so as to reflect the measuring result thereof to an output setting level of ALC. In FIG. 20, for a constitution (see FIG. 5, for example) such as disclosed in the aforementioned OAA'98, WA2, pp.173–176, and OAA'98, MD1, pp.54–57, a part of output light of the succeeding optical amplifier 41 is branched by an optical branching section 51D, and the thus branched light is input into an optical spectrum analyzer (SP) 51E for measuring a spectrum of the output light to thereby detect averaged signal light power per one wavelength. Corresponding to the detection result, the optical attenuation amount of the variable optical attenuator 42 is controlled in accordance with a signal from the ALC circuit 42A such that the signal light power per one wavelength included in output light from the optical amplifier 41 becomes a required constant value.

In this way, according to the WDM optical communication system of the embodiment (2-2), it is also possible to improve transmission characteristics of WDM signal light, by actually measuring signal light power per one wavelength at each of the optical amplifying devices, and by controlling an output setting level of ALC, to thereby fix the signal light power per one wavelength at a required constant value.

There have been described WDM optical communication systems in the aforementioned embodiments, respectively. However, it is apparent that the present invention is effective not only as a WDM optical communication system but also as an optical amplifying device provided with an output correcting function.

I claim:

1. A wavelength division multiplexing optical communication system including:

at least one optical amplifying device capable of collectively amplifying wavelength division multiplexed signal light, wherein output light of said optical amplifying device is controlled to be a predetermined output setting level, and wherein said wavelength division multiplexing optical communication system further comprises:

signal light output power controlling means for controlling an operation of said optical amplifying device by correcting said predetermined output setting level based on a noise light power generated in said optical amplifying device, so that a signal light power per one wavelength included in the output light of said optical amplifying device, is kept constant irrespectively of the number of wavelengths of signal light.

2. A wavelength division multiplexing optical communication system of claim 1,
wherein said signal light output power controlling means comprises:
an input light measuring section for measuring input light power of said optical amplifying device;
a correction value calculating section for obtaining noise light power caused at said optical amplifying device, based on:
the input light power measured at said input light measuring section;
a noise figure corresponding to the input light power of said optical amplifying device;
a bandwidth of said optical amplifying device; and
the number of wavelengths of the signal light, so as to calculate an output correction value for increasing the output setting level of said optical amplifying device by the noise light power; and
a correction executing section for executing a correction for the output setting level of said optical amplifying device, in accordance with the output correction value calculated by said correction value calculating section.

3. A wavelength division multiplexing optical communication system of claim 2,
wherein said input light measuring section and said correction executing section are provided for each of a plurality of optical amplifying devices; and
said correction value calculating section is provided in the number of at least one for said plurality of optical amplifying devices, so as to collectively calculate said output correction values for said respective optical amplifying devices, based on input light power, noise figure, bandwidth, and the number of wavelengths of the signal light transmitted from each of said plurality of optical amplifying devices, to notify the thus calculated output correction values to said correction executing sections of the corresponding optical amplifying devices, respectively.

4. A wavelength division multiplexing optical communication system of claim 3,
wherein said correction value calculating section calculates, as the output correction values for said plurality of optical amplifying devices, respectively, correction ratios Δ each of which is represented by a ratio of a correction amount relative to pre-correction output light power;
such that the correction ratio $\Delta_k$ for an optical amplifying device at a k-th stage is given by the following equation:

$$\Delta_k = \sum_{i=1}^{k} \left\{ \frac{hv \cdot \Delta f}{m} \cdot 10^{\frac{NF_i - 10\log\left(\frac{P_{Tin(i)}}{m}\right) + 10\log(1+\delta 1-1)}{10}} \right\}$$

in which:
a correction ratio which has been executed for an optical amplifying device at an i-th stage when measuring the input light power is $\delta_i$;
total input light power is $P_{Tin(i)}$;
a noise figure corresponding to the total input light power $P_{Tin(i)}$ is $NF_i$;
a bandwidth is Δf;
the number of wavelengths of the signal light is m; and
a photon energy is hv.

5. A wavelength division multiplexing optical communication system of claim 3,
wherein transmission of information to be performed between said correction value calculating section and said plurality of optical amplifying devices is conducted by an optical signal having a wavelength different from that of main signal light included in said wavelength division multiplexed signal light.

6. A wavelength division multiplexing optical communication system of claim 2,
wherein said signal light output power controlling means are provided for each of a plurality of optical amplifying devices; and
wherein each of correction value calculating sections of respective signal light output power controlling means is constituted to calculate an output correction value for the associated optical amplifying device, based on:
an output correction value for an optical amplifying device at a preceding stage, and;
input light power measured at the associated input light measuring section, a noise figure and a bandwidth corresponding to the input light power, for the associated optical amplifying device, and;
the number of wavelengths of the signal light;
so as to notify the thus calculated output correction value to the associated correction executing section, and to simultaneously transmit the thus calculated output correction value toward a correction value calculating section of an optical amplifying device at a succeeding stage;
so that output correction values are set sequentially from optical amplifying device at an optical transmitting station side toward optical amplifying device at an optical receiving station side.

7. A wavelength division multiplexing optical communication system of claim 6,
wherein each of said correction value calculating sections calculates, as the output correction value for the associated optical amplifying device, a correction ratio Δ which is represented by a ratio of a correction amount relative to pre-correction output light power;
such that the correction ratio $\Delta_k$ for an optical amplifying device at a k-th stage is given by the following equation:

$$\Delta_k = \Delta_{k-1} + \frac{hv \cdot \Delta f}{m} \cdot 10^{\frac{NF_k - 10\log\left(\frac{P_{Tin(k)}}{m}\right) + 10\log(1+\delta k-1)}{10}}$$

in which:
a correction ratio which has been executed for an optical amplifying device at a preceding stage when measuring the input light power is $\delta_{k-i}$;
total input light power is $P_{Tin(k)}$;
a noise figure corresponding to the total input light power $P_{Tin(k)}$ is $NF_k$;
a bandwidth is Δf;
the number of wavelengths of the signal light is m; and
a photon energy is hv.

8. A wavelength division multiplexing optical communication system of claim 6,
wherein each of said correction value calculating sections calculates, as the output correction value for the associated optical amplifying device, a value d which is obtained by multiplying, a correction ratio Δ which is represented by a ratio of a correction amount relative to pre-correction output light power, by the number of wavelengths of the signal light;

such that the value $d_k$ for an optical amplifying device at a k-th stage is given by the following equation:

$$d_k = d_{k-1} + hv \cdot \Delta f \cdot 10^{\frac{NF_k - 10\log\left(\frac{P_{Tin(k)}}{m}\right) + 10\log(1+\delta_{k-1})}{10}}$$

in which:
  a correction ratio which has been executed for an optical amplifying device at a preceding stage when measuring the input light power is $\delta_{k-i}$;
  total input light power is $P_{Tin(k)}$;
  a noise figure corresponding to the total input light power $P_{Tin(k)}$ is $NF_k$;
  a bandwidth is $\Delta f$;
  the number of wavelengths of the signal light is m; and
  a photon energy is hv.

9. A wavelength division multiplexing optical communication system of claim 6,
  wherein transmission of information to be performed between said correction value calculating sections provided at said plurality of optical amplifying devices is conducted by an optical signal having a wavelength different from that of main signal light included in said wavelength division multiplexed signal light.

10. A wavelength division multiplexing optical communication system of claim 2,
  wherein said noise figure, which corresponds to the input light power of said optical amplifying device and which is utilized by said correction value calculating section, is given by a linear approximate equation.

11. A wavelength division multiplexing optical communication system of claim 2,
  wherein said correction value calculating section recalculates the output correction value at intervals of a fixed period of time, to notify the calculated output correction value to said correction executing section.

12. A wavelength division multiplexing optical communication system of claim 2,
  wherein said correction value calculating section recalculates the output correction value to notify the thus calculated output correction value to said correction executing section, when the input light power measured at said input light measuring section deviates, from a value of input light power at the time when the output correction value was lastly calculated, by a constant value or more.

13. A wavelength division multiplexing optical communication system of claim 2,
  wherein said correction value calculating section calculates output correction values corresponding to the respective number of wavelengths up to the maximum number of settable wavelengths, respectively, and stores the thus calculated output correction values, and
  wherein upon occurrence of change in the number of wavelengths, said correction value calculating section reads out the output correction value which corresponds to the number of wavelengths after the wavelength-number change, so as to notify the thus read-out output correction value to said correction executing section.

14. A wavelength division multiplexing optical communication system of claim 1,
  wherein said signal light output power controlling means comprises:
  a correction value storing section for storing output correction values which have been previously calculated corresponding to a combination of: the number of wavelengths of signal light which are predictable in the system, and the stage number of the applicable optical amplifying device from an optical transmitting station side;
  a setting notification section for notifying information concerning the number of wavelengths of the signal light at present and the stage number of said optical amplifying device from the optical transmitting station side, to said optical amplifying device; and
  a correction executing section for reading out the output correction value corresponding to the information from said setting notification section, from said correction value storing section, so as to execute a correction in accordance with the thus read out output correction value for the output setting level of said optical amplifying device.

15. A wavelength division multiplexing optical communication system of claim 14,
  wherein said correction value storing section stores, as said output correction values, correction ratios each of which is represented by a ratio of a correction amount relative to pre-correction output light power;
  such that a correction ratio $\Delta_k$ for an optical amplifying device at a k-th stage is given by the following equation:

$$\Delta_k = \sum_{i=1}^{k} \left\{ \frac{hv \cdot \Delta f}{m} \cdot 10^{\frac{NF_i - 10\log\left(\frac{P_{insig(i)}}{m}\right)}{10}} \right\}$$

wherein:
  averaged input signal light power per one wavelength, previously settled for an i-th stage is $P_{insig(i)}$;
  a noise figure corresponding to the averaged input signal light power $P_{insig(i)}$ is $NF_i$;
  a bandwidth is $\Delta f$;
  the number of wavelengths of the signal light is m; and
  a photon energy is hv.

16. A wavelength division multiplexing optical communication system of claim 14,
  wherein transmission of information to be performed between said setting notification section and said optical amplifying device is conducted by an optical signal having a wavelength different from that of main signal light included in said wavelength division multiplexed signal light.

17. A wavelength division multiplexing optical communication system of claim 1,
  wherein said signal light output power controlling means comprises:
  an optical measuring section capable of measuring at least one of: a signal light power per one wavelength to be output from said optical amplifying device; and a noise light power caused at said optical amplifying device; and
  a correction executing section for executing a correction of an output setting level of said optical amplifying device, based on the measuring result of said optical measuring section.

18. A wavelength division multiplexing optical communication system of claim 17,
wherein said, optical measuring section comprises:
an optical filter which has a transmission band within a band of said optical amplifying device except for a wavelength band of the signal light, and which is capable of extracting a part of noise light included in branched light obtained from said optical amplifying device, and
a noise light detector for detecting a noise light power caused at said optical amplifying device, based on the transmitted light through said optical filter; and
wherein said correction executing section executes a correction for increasing the output setting level of said optical amplifying device, by the noise light power detected by said noise light detector.

19. A wavelength division multiplexing optical communication system of claim 17,
wherein said optical measuring section comprises:
an optical spectrum measurer for measuring a spectrum of output light of said optical amplifying device, and
a signal light detector for detecting averaged signal light power per one wavelength included in the output light, based on the measuring result of said optical spectrum measurer; and
wherein said correction executing section corrects the output setting level of said optical amplifying device so that the signal light power detected by said signal light detector becomes a constant value.

20. An optical amplifying device capable of collectively amplifying wavelength division multiplexed signal light from a wavelength division multiplexed signal light source, in which the output light of the optical amplifying device is controlled to be a predetermined output setting level, said optical amplifying device comprising:
signal light output power controlling means for controlling the optical amplifying operation by correcting said predetermined output setting level based on a noise light power generated, so that signal light power per one wavelength included in the output light, is kept constant irrespectively of the number of wavelengths of signal light.

21. A wavelength division multiplexing optical communication system, comprising:
at least one optical amplifying device capable of collectively amplifying wavelength division multiplexed signal light, the output light of said at least one optical amplifying device being controlled to be a predetermined output setting level; and
a signal light output power controlling device controlling an operation of said at least one optical amplifying device by correcting the predetermined output setting level based on a noise light power generated in said at least one optical amplifying device, so that a signal light power per one wavelength included in the output light of said at least one optical amplifying device, is kept constant irrespective of the number of wavelengths of signal light.

22. An optical amplifying device capable of collectively amplifying wavelength division multiplexed signal light, in which the output light of the optical amplifying device is controlled to be a predetermined output setting level, said optical amplifying device comprising a signal light output power controlling device controlling the optical amplifying operation by correcting the predetermined output setting level based on the noise light power generated in said optical amplifying device, so that signal light power per one wavelength included in the output light of the optical amplifying device, is kept constant irrespective of the number of wavelengths of signal light.

23. A wavelength division multiplexing optical communication method comprising:
collectively amplifying wavelength division multiplexed signal light in an optical amplifying device;
controlling an output light of the optical amplifying device to be a predetermined output setting level; and
controlling an operation of the optical amplifying device by correcting the predetermined output setting level based on a noise signal power generated in the optical amplifying device, so that a signal light power per one wavelength included in the output light of the optical amplifying device, is kept constant irrespective of the number of wavelengths of signal light.

24. An optical amplifying method for use with an optical amplifying device capable of collectively amplifying wavelength division multiplexed light, comprising:
controlling an output light of the optical amplifying device to be a predetermined output setting level; and
controlling the optical amplifying operation by correcting the predetermined output setting level based on a noise light power generated, so that signal light power per one wavelength included in the output light, is kept constant irrespective of the number of wavelengths of signal light.

* * * * *

UNITED STATES PATENT AND TRADEMARK OFFICE
CERTIFICATE OF CORRECTION

PATENT NO. : 6,639,716 B1
DATED : October 28, 2003
INVENTOR(S) : Hiraoki Tomofuji It is certified that error appears in the above-identified patent and that said Letters Patent is hereby corrected as shown below:

<u>Column 29,</u>
Line 67, please change "$P_{yin(i)}$" to -- $P_{Tin(i)}$ --.

<u>Column 31,</u>
Line 19, please delete "$P_{Tin(k)}$".
Line 22, after "hv", please insert -- ; and -- then make a new paragraph and insert:
-- wherein each of said correction value calculating sections transmits only the value d calculated for one wavelength as the output correction value of the associated optical amplifying device, to a correction value calculating section of an optical amplifying device at a succeeding stage. --.

<u>Column 33,</u>
Line 3, after "said", please delete -- , --.

Signed and Sealed this

Ninth Day of March, 2004

JON W. DUDAS
*Acting Director of the United States Patent and Trademark Office*